(12) United States Patent
Ahammer et al.

(10) Patent No.: US 12,077,386 B2
(45) Date of Patent: Sep. 3, 2024

(54) STORAGE ARRANGEMENT AND PICKING SYSTEM HAVING IMPROVED LOADING AND RETRIEVAL OF LOADED ITEMS AND METHOD FOR OPERATING SAME

(71) Applicant: TGW Mechanics GmbH, Wels (AT)

(72) Inventors: Christian Ahammer, Gunskirchen (AT); Christoph Haslehner, Prambachkirchen (AT); Johannes Schauer, St. Marienkirchen an der Polsenz (AT); Harald Schroepf, Wels (AT); Martin Rausch, Gmunden (AT)

(73) Assignee: TGW Mechanics GmbH, Wels (AT)

( * ) Notice: Subject to any disclaimer, the term of this patent is extended or adjusted under 35 U.S.C. 154(b) by 658 days.

(21) Appl. No.: 17/292,751

(22) PCT Filed: Nov. 19, 2019

(86) PCT No.: PCT/AT2019/060392
§ 371 (c)(1),
(2) Date: May 11, 2021

(87) PCT Pub. No.: WO2020/113249
PCT Pub. Date: Jun. 11, 2020

(65) Prior Publication Data
US 2021/0395015 A1    Dec. 23, 2021

(30) Foreign Application Priority Data
Dec. 7, 2018    (AT) .............................. A 51090/2018

(51) Int. Cl.
*B65G 1/137*    (2006.01)
*B65G 1/04*    (2006.01)
(Continued)

(52) U.S. Cl.
CPC ......... *B65G 1/1378* (2013.01); *B65G 1/0485* (2013.01); *B65G 1/0492* (2013.01); *B65G 1/06* (2013.01); *B66F 9/02* (2013.01)

(58) Field of Classification Search
CPC ...... B65G 1/0485; B65G 1/06; B65G 1/1378; B65G 1/0492; B66F 9/02
See application file for complete search history.

(56) References Cited

U.S. PATENT DOCUMENTS

| 5,564,879 A | 10/1996 | Noguchi |
| 6,406,246 B1 | 6/2002 | Itoh et al. |

(Continued)

FOREIGN PATENT DOCUMENTS

| AT | 509294 A1 | 7/2011 |
| AT | 511 140 A1 | 9/2012 |

(Continued)

OTHER PUBLICATIONS

International Search Report in PCT/AT2019/060392, mailed Mar. 24, 2020.

*Primary Examiner* — Saul Rodriguez
*Assistant Examiner* — Willie W Berry, Jr.
(74) *Attorney, Agent, or Firm* — Collard & Roe, P.C.

(57) ABSTRACT

A storage arrangement having multiple storage racks, a storage buffer device for interim buffering of a load during storage, a retrieval buffer device for interim buffering of a load during retrieval, and storage and retrieval devices for servicing the storage places of the storage racks is provided. The storage arrangement additionally comprises a storage vertical conveying device having multiple storage transport platforms and a retrieval vertical conveying device having multiple retrieval transport platforms. A storage conveying system is connected to the storage vertical conveying device, and a retrieval conveying system is connected to the retrieval vertical conveying device. A control system ensures (Continued)

that the storage transport platforms and the retrieval transport platforms are moved independently of one another. In addition, an order-picking system with a storage arrangement of the above-mentioned type and a method for operating the storage arrangement are provided.

33 Claims, 5 Drawing Sheets

(51) Int. Cl.
    *B65G 1/06*         (2006.01)
    *B66F 9/02*         (2006.01)

(56) References Cited

U.S. PATENT DOCUMENTS

| | | |
|---|---|---|
| 7,787,958 B2 | 8/2010 | Stevenson |
| 8,276,739 B2 | 10/2012 | Bastan, II et al. |
| 8,327,609 B2 | 12/2012 | Krizmanic et al. |
| 8,439,167 B2 | 5/2013 | Kocher et al. |
| 8,733,507 B2 | 5/2014 | Smith et al. |
| 8,876,454 B2 | 11/2014 | Koholka |
| 9,266,675 B2 * | 2/2016 | Yamashita ............ B65G 1/0492 |
| 9,334,113 B2 | 5/2016 | Naylor |
| 9,725,238 B2 | 8/2017 | Mathys et al. |
| 9,771,214 B1 | 9/2017 | Green et al. |
| 9,771,217 B2 | 9/2017 | Lert et al. |
| 9,850,066 B2 | 12/2017 | Salichs et al. |
| 9,988,212 B2 | 6/2018 | Yamashita |
| 10,173,839 B2 | 1/2019 | Ahammer et al. |
| 10,611,568 B2 | 4/2020 | Schack et al. |
| 11,046,514 B2 | 6/2021 | Hart et al. |
| 11,198,560 B2 | 12/2021 | Schack et al. |
| 11,780,675 B2 | 10/2023 | Hart et al. |
| 2004/0159501 A1 | 8/2004 | Bloch et al. |
| 2008/0247848 A1 | 10/2008 | Freudelsperger |
| 2010/0158648 A1 | 6/2010 | Schaefer |
| 2012/0185080 A1 | 7/2012 | Cyrulik et al. |
| 2012/0207567 A1 * | 8/2012 | Koholka ............... B65G 1/0485 414/277 |
| 2012/0282068 A1 | 11/2012 | Tschurwald et al. |
| 2015/0239667 A1 | 8/2015 | Naylor |
| 2016/0009492 A1 * | 1/2016 | Stevens ................. B65G 1/137 414/807 |
| 2016/0264356 A1 | 9/2016 | Wakizaka |
| 2016/0355339 A1 | 12/2016 | Peng |
| 2018/0208397 A1 | 7/2018 | Schack et al. |
| 2020/0071074 A1 | 3/2020 | Hart et al. |
| 2020/0198891 A1 | 6/2020 | Schack et al. |

FOREIGN PATENT DOCUMENTS

| | | | |
|---|---|---|---|
| AT | 521359 | B1 | 1/2020 |
| CN | 2319384 | Y | 5/1999 |
| CN | 2707897 | Y | 7/2005 |
| CN | 101641270 | A | 2/2010 |
| CN | 102725213 | A | 10/2012 |
| CN | 104066661 | A | 9/2014 |
| CN | 105392719 | A | 3/2016 |
| CN | 106564806 | A | 4/2017 |
| CN | 107032035 | A | 8/2017 |
| CN | 206456846 | U | 9/2017 |
| CN | 107986139 | A | 5/2018 |
| CN | 108116826 | A | 6/2018 |
| DE | 24 41 557 | A1 | 3/1976 |
| DE | 20 2004 008678 | U1 | 8/2004 |
| DE | 20 2006 003068 | U1 | 7/2007 |
| DE | 10 2011 012 424 | A1 | 8/2012 |
| DE | 10 2013 114 275 | A1 | 6/2014 |
| EP | 0 658 508 | A1 | 6/1995 |
| EP | 1 716 060 | B1 | 7/2007 |
| EP | 2 158 144 | B1 | 3/2010 |
| EP | 2 132 113 | B1 | 11/2011 |
| EP | 2 436 620 | A2 | 4/2012 |
| EP | 2 327 643 | B1 | 4/2013 |
| EP | 2 949 604 | A1 | 12/2015 |
| EP | 2 673 217 | B1 | 10/2016 |
| EP | 3 354 598 | A1 | 8/2018 |
| EP | 3354598 | A1 | 8/2018 |
| EP | 2 709 933 | B1 | 4/2020 |
| EP | 3 188 987 | B1 | 12/2020 |
| JP | S50-150963 | U | 12/1975 |
| JP | H07-112805 | A | 5/1995 |
| JP | 2007-238197 | A | 9/2007 |
| JP | 2009-121583 | A | 6/2009 |
| JP | 2010-052873 | A | 3/2010 |
| JP | 2016-060622 | A | 4/2016 |
| JP | 2016-155659 | A | 9/2016 |
| JP | 2016/169083 | A | 9/2016 |
| KR | 100886373 | B1 | 3/2009 |
| WO | 2012/106744 | A1 | 8/2012 |
| WO | 2012/155169 | A1 | 11/2012 |
| WO | 2013/090970 | A1 | 6/2013 |
| WO | 2015/181109 | A1 | 12/2015 |
| WO | 2015181108 | A1 | 12/2015 |
| WO | 2016/033628 | A1 | 3/2016 |

* cited by examiner

STORAGE ARRANGEMENT AND PICKING SYSTEM HAVING IMPROVED LOADING AND RETRIEVAL OF LOADED ITEMS AND METHOD FOR OPERATING SAME

CROSS REFERENCE TO RELATED APPLICATIONS

This application is the National Stage of PCT/AT2019/060392 filed on Nov. 19, 2019, which claims priority under 35 U.S.C. § 119 of Austrian Application No. A 51090/2018 filed on Dec. 7, 2018, the disclosure of which is incorporated by reference. The international application under PCT article 21(2) was not published in English.

BACKGROUND OF THE INVENTION

1. Field of the Invention

The invention relates to a storage arrangement comprising a rack arrangement having a first storage rack and a second storage rack, each having storage places for loads, and a rack aisle between the first storage rack and the second storage rack. The storage places are arranged in storage planes located one above the other. The storage arrangement further comprises a storage buffer device having storage provisioning devices arranged in provisioning planes located one above the other and each configured for interim buffering of a load or multiple loads, as well as a retrieval buffer device having retrieval provisioning devices arranged in provisioning planes located one above the other and each configured for interim buffering of a load or multiple loads. The storage arrangement further comprises storage and retrieval devices, which are each movable on a horizontal travel plane in the rack aisle in front of the storage places, in front of the storage provisioning devices and in front of the retrieval provisioning devices, and which each have a load receiving device and are configured for transporting the loads from the storage provisioning devices to the storage places and for transporting the loads from the storage places to the retrieval provisioning devices. This means that the storage and retrieval devices are configured for providing a conveyor connection between the storage provisioning devices and the storage places and a conveyor connection between the storage places and the retrieval provisioning devices. The invention further relates to an order-picking system with a storage arrangement of the above-mentioned type as well as to a method for operating a storage arrangement of the above-mentioned type.

2. Description of the Related Art

A storage arrangement and a method for operating such a storage arrangement are basically known in the art. For example, US 2016/264356 A2 in this regard discloses a storage arrangement with a storage rack, storage/retrieval buffer devices and storage and retrieval devices, which are movable in the travel planes of the storage arrangement. At the front end, a vertical conveying device with two vertically and laterally movable transport platforms is connected.

Furthermore, JP 2016/169083 A in this regard discloses a storage arrangement with a storage rack, storage/retrieval buffer devices and storage and retrieval devices, which are movable in the travel planes of the storage arrangement. JP 2016/169083 A further discloses two vertical conveying devices connected in series, each having two transport platforms and one interposed buffer device.

Finally, EP 3 354 598 A1 discloses another storage arrangement with a storage rack, storage/retrieval buffer devices and storage and retrieval devices, which are movable in the travel planes of the storage arrangement. At the front end, a vertical conveying device with two vertically movable transport platforms is connected.

The known methods have the disadvantage that the storage transport platforms and the retrieval transport platforms cannot be moved within the storage movement areas and the retrieval movement areas without influencing one another. During the process of storing loads and during the process of retrieving loads, mutual dependence occurs. Consequently, the system altogether becomes slow and prone to failure, and blockages during storage and retrieval of loads may also occur. Therefore, the control effort for the aforementioned storage arrangements is very high.

SUMMARY OF THE INVENTION

It is an object of the invention now to provide an improved storage arrangement, an improved order-picking system and an improved method for operating a storage arrangement. In particular, mutual dependence during the process of storing loads and during the process of retrieving loads is supposed to be avoided, and the control effort for said storage arrangement is thus supposed to be reduced.

The object of the invention is achieved with a storage arrangement of the above-mentioned type, additionally comprising a storage vertical conveying device associated with the rack aisle and having multiple storage transport platforms, which are controllable independently of one another and each movable in a storage movement area relative to the provisioning planes, and a storage conveying system associated with the rack aisle and connected in terms of conveyance to the storage vertical conveying device for transporting loads to the storage vertical conveying device, wherein the loads are transportable by means of the storage transport platforms from the storage conveying system to the storage provisioning devices, a retrieval vertical conveying device associated with the rack aisle and having multiple retrieval transport platforms, which are controllable independently of one another and each movable in a retrieval movement area relative to the provisioning planes, and a retrieval conveying system associated with the rack aisle and connected in terms of conveyance to the retrieval vertical conveying device for transporting loads away from the retrieval vertical conveying device, wherein the loads are transportable by means of the retrieval transport platforms from the retrieval provisioning devices to the retrieval conveying system, and a control system configured for controlling the storage transport platforms and the retrieval transport platforms independently of one another.

In particular, only the storage conveying system is connected to the storage vertical conveying device on the input side (i.e. in particular on an output side facing away from the storage buffer device), and only the retrieval conveying system is connected to the retrieval vertical conveying device on the output side (i.e. in particular on an input side facing away from the retrieval buffer device). This means that in this embodiment, the retrieval conveying system is not connected to the storage vertical conveying device, and the storage conveying system is not connected to the retrieval vertical conveying device. The storage conveying system delivers loads that are to be stored and releases them to the storage vertical conveying device only, and loads to be retrieved are released onto the retrieval conveying system by the retrieval vertical conveying device only and transported away by the retrieval conveying system. In this connection, it is also advantageous if the storage provisioning devices of the storage buffer device each (exclusively) serve for storing in all provisioning planes in which they are arranged, and the retrieval provisioning devices of the retrieval buffer device each (exclusively) serve for retrieving in all provisioning planes in which they are arranged.

The object of the invention is also achieved by a method for operating the disclosed storage arrangement, in which method a control system controls the storage transport platforms such that loads to be stored are taken over from the storage conveying system and released onto the storage buffer device, and the control system controls the retrieval transport platforms such that loads to be retrieved are taken over from the retrieval buffer device and released onto the retrieval conveying system.

Finally, the object of the invention is achieved by an order-picking system with a storage arrangement of the above-mentioned type, which additionally comprises a first order-picking station and a second order-picking station.

The storage transport platforms and the retrieval transport platforms are advantageously controlled by the control system separately or independently of one another. Thus, the storage movement areas do not overlap with the retrieval movement areas. This way, the process of storing loads and the process of retrieving loads may be carried out in parallel and decoupled from one another by means of multiple storage transport platforms and multiple retrieval transport platforms, respectively. This means that the storage transport platforms and the retrieval transport platforms are movable (with maximum speed of movement) within the storage movement areas and the retrieval movement areas, respectively, without influencing one another. The conveying streams comprising a conveying stream with loads to be stored and a conveying stream with loads to be retrieved are handled separately by the storage vertical conveying device and the retrieval vertical conveying device. The complexity of the control mechanism of the storage arrangement and the control effort for the storage arrangement may thus be reduced. In particular, as opposed to the prior art, loads to be stored do not lead to blockages during retrieval of loads, and vice versa.

The first storage transport platform and the second storage transport platform each service a number of storage planes. The control system may control the first storage transport platform and the second storage transport platform such that the loads are taken over by the first storage transport platform from the first storage conveying device and by the second storage transport platform from the second storage conveying device. The storage movement areas of the first storage transport platform and the second storage transport platform may be separate from and adjacent to one another. By means of this control measure, the first storage transport platform and the second storage transport platform may be moved within the respectively associated storage movement area at high speed of movement without risk of collision, so that high storage capacity is achieved.

However, it is also possible that the storage movement areas overlap and thus have a storage overlapping area. In this regard, the control system prevents collisions of the first storage transport platform and the second storage transport platform in the storage overlapping area. In this case, the control system may also be configured for controlling the first storage transport platform and the second storage transport platform such that the loads are taken over by the first storage transport platform from the second storage conveying device and by the second storage transport platform from the first storage conveying device. By means of this control measure, the first storage transport platform and the second storage transport platform may be utilized in a particularly flexible manner.

The first retrieval transport platform and the second retrieval transport platform each also service a number of storage planes. The control system may control the first retrieval transport platform and the second retrieval transport platform such that the loads are released by the first retrieval transport platform to the first retrieval conveying device and by the second retrieval transport platform to the second retrieval conveying device. The retrieval movement areas of the first retrieval transport platform and the second retrieval transport platform may be separate from and adjacent to one another. By means of this control measure, the first retrieval transport platform and the second retrieval transport platform may be moved within the respectively associated retrieval movement area at high speed of movement without risk of collision, so that high retrieval capacity is achieved.

However, it is also possible that the retrieval movement areas overlap and thus have a retrieval overlapping area. In this regard, the control system prevents collisions of the first retrieval transport platform and the second retrieval transport platform in the retrieval overlapping area. In this case, the control system may also be configured for controlling the first retrieval transport platform and the second retrieval transport platform such that the loads are released by the first retrieval transport platform to the second retrieval conveying device and by the second retrieval transport platform to the first retrieval conveying device. By means of this control measure, the first retrieval transport platform and the second retrieval transport platform may be utilized in a particularly flexible manner.

The control system may particularly comprise a retrieval control unit and a storage control unit.

It is also advantageous if the retrieval vertical conveying device is structurally separate from the storage vertical conveying device. This means that there are no overlaps with regard to the mechanical components required for moving the transport platforms. In other words, there is no joint use of the mechanical components required for moving the transport platforms. This way, the process of storing loads by means of multiple storage transport platforms may be decoupled even better from the process of retrieving loads by means of multiple retrieval transport platforms.

The retrieval vertical conveying device and the storage vertical conveying device may be set up in the transverse direction of the rack aisle at a distance from one another or substantially at the same transverse position in the transverse direction of the rack aisle. In addition, it is possible that the retrieval vertical conveying device and the storage vertical conveying device are arranged in the longitudinal direction of the rack aisle at a distance from one another or substantially at the same longitudinal position in the longitudinal direction of the rack aisle.

The retrieval vertical conveying device and the storage vertical conveying device may in particular substantially be arranged at a distance of an aisle width between one another and arranged opposite of one another in a mirror-inverted manner.

It is also possible that the retrieval vertical conveying device and the storage vertical conveying device are arranged offset relative to one another in the longitudinal direction of the rack aisle and on the same side of the rack aisle.

Finally, it is also possible that the retrieval vertical conveying device and the storage vertical conveying device are arranged at a distance of an aisle width between one another and arranged offset relative to one another in the longitudinal direction of the rack aisle.

In general, the storage arrangement may have more than two storage racks and more than one rack aisle. In this case, one retrieval vertical conveying device and one storage vertical conveying device may be provided per rack aisle.

The storage of loads comprises storing loads from the incoming goods department (new goods or returned goods) and may also comprise re-storage of loads (which were not required for a picking order) from the one or the multiple order-picking stations. The retrieval of loads comprises retrieving loads which are required for a picking order.

Preferably, the storage buffer device is arranged between the first storage rack and the storage vertical conveying device, and the retrieval buffer device between the second storage rack and the retrieval vertical conveying device.

If storage movement areas have an overlapping area, they may overlap completely or only partially. In an equivalent manner, retrieval movement areas may overlap completely or only partially if they have an overlapping area.

The first storage transport platform and the second storage transport platform are particularly arranged directly vertically above one another. Basically, the first storage transport platform and the second storage transport platform may be moved on respectively separate masts. However, it is advantageous if the first storage transport platform and the second storage transport platform are moved on one single mast.

The same applies to the retrieval side. The first retrieval transport platform and the second retrieval transport platform may be arranged directly vertically above one another. Basically, the first retrieval transport platform and the second retrieval transport platform may be moved on respectively separate masts. However, also in this case, it is advantageous if the first retrieval transport platform and the second retrieval transport platform are moved on one single mast.

The (multiple) storage transport platforms may thus be arranged vertically above one another at a storage guide assembly (which is comprised by the storage vertical conveying device) and moved by the control system independently of one another. The (multiple) retrieval transport platforms may be arranged vertically above one another at a retrieval guide assembly (which is comprised by the retrieval vertical conveying device) and moved by the control system independently of one another.

The storage guide assembly for the storage transport platforms may be formed at a stationary storage vertical mast. The retrieval guide assembly for the retrieval transport platforms may be formed at a stationary retrieval vertical mast. As already mentioned, the storage vertical mast and the retrieval vertical mast may be structurally separate from one another. Preferably, in this case, the storage vertical mast and the storage transport platforms as well as the storage buffer device are arranged on a first side transversely to the longitudinal extension of the rack aisle and outside the rack aisle, and the retrieval vertical mast and the retrieval transport platforms as well as the retrieval buffer device are arranged on a second side transversely to the longitudinal extension of the rack aisle and outside the rack aisle.

It is also conceivable that the storage vertical mast and the retrieval vertical mast are combined and formed by one single storage and retrieval vertical mast. In this case, the storage transport platforms as well as the storage buffer device may be arranged on a first side transversely to the longitudinal extension of the rack aisle and outside the rack aisle, and the retrieval transport platforms as well as the retrieval buffer device may be arranged on a second side transversely to the longitudinal extension of the rack aisle and outside the rack aisle. The (single) storage and retrieval vertical mast then forms a first guide assembly for the storage transport platforms on a first side and a second guide assembly for the retrieval transport platforms on a second side. Such an embodiment is particularly advantageous if the rack aisle ends at the storage and retrieval vertical mast.

In general, one storage vertical conveying device and/or one retrieval vertical conveying device may be associated with exactly one rack aisle. However, it is also conceivable that one storage vertical conveying device and/or one retrieval vertical conveying device is associated with multiple rack aisles. For example, at one single storage vertical mast, storage transport platforms may be arranged, which are associated with two rack aisles. For example, two storage transport platforms arranged one above the other may be associated with a first rack aisle, and two other storage transport platforms arranged one above the other with a second rack aisle. Likewise, at one single retrieval vertical mast, retrieval transport platforms may be arranged, which are associated with two rack aisles. For example, two retrieval transport platforms arranged one above the other may be associated with a first rack aisle, and two other retrieval transport platforms arranged one above the other with a second rack aisle.

Preferably, the first storage conveying device comprises conveying sections, which are successively arranged in the storage conveying direction of the loads, of which conveying sections a first conveying section has at least one first feeding track, a second conveying section has a first distribution track, a third conveying section has at least one first return conveying track, and a fourth conveying section has first storage tracks associated with the storage vertical conveying device. The at least one first feeding track is connected to the first distribution track and delivers the loads from an incoming goods department. The first storage tracks are connected to the first distribution track and transport the loads to the respective storage vertical conveying device. The at least one first return conveying track connects the at least one first order-picking station to the first distribution track and transports loads that are not required away from the first order-picking station after a picking process.

The first distribution track is preferably (but not necessarily) formed by a closed first storage circular conveying track (storage loop), by which a number of first feeding tracks are connected, which lead to the storage vertical conveying devices. The loads to be stored may be distributed from the first storage circular conveying track (storage loop) to one or multiple first storage tracks.

Preferably, the second storage conveying device comprises storage conveying sections, which are successively arranged in the storage conveying direction of the loads, of which storage conveying sections a first conveying section has at least one second feeding track, a second conveying section has one second distribution track, a third conveying section has at least one second return conveying track, and a fourth conveying section has second storage tracks associated with the storage vertical conveying device. The second feeding track is connected to the second distribution track and delivers the loads from an incoming goods department. The second storage tracks are connected to the second distribution track and transport the loads to the respective storage vertical conveying device. The at least one second return conveying track connects the second order-picking station to the second distribution track and transports the loads away from the second order-picking station after a picking process.

The second distribution track is preferably formed by a closed second storage circular conveying track (storage loop), by which a number of second storage tracks are connected, which lead to the storage vertical conveying devices. The loads to be stored may be distributed from the second storage circular conveying track (storage loop) to one or multiple second storage tracks.

In particular, the first/second feeding track, the first/second storage distribution track, the first/second return conveying track and the first/second storage track may each comprise conveying devices, such as belt conveyors, roller conveyors, and the like.

Transfer of the loads from the first/second feeding track onto the first/second storage distribution track, transfer of the loads from the first/second return conveying track onto the first/second storage distribution track and transfer of the loads from the first/second storage distribution track onto the first/second storage track may be enabled by means of infeed and outfeed devices. The infeed and outfeed devices comprise, for example, strap offsets, skate wheel transfers, and the like.

Preferably, the first retrieval conveying device comprises retrieval conveying sections, which are successively arranged in the retrieval conveying direction of the loads, of which retrieval conveying sections a first conveying section has first retrieval tracks associated with the retrieval vertical conveying device, a second conveying section comprises a first retrieval distribution track connecting the first retrieval tracks, and a third conveying section comprises at least one second feeding track. The second feeding track connects the first order-picking station to the first retrieval distribution track and transports the loads to the first order-picking station.

The first retrieval distribution track is preferably (but not necessarily) formed by a closed first retrieval circular conveying track (retrieval loop), by which a number of first retrieval tracks leading away from the retrieval vertical conveying devices are connected and the retrieved loads are distributed to one or multiple first order-picking stations.

Preferably, the second retrieval conveying device comprises retrieval conveying sections, which are successively arranged in the retrieval conveying direction of the loads, of which retrieval conveying sections a first conveying section has retrieval tracks associated with the retrieval vertical conveying device, a second conveying section comprises a second retrieval distribution track connecting the second retrieval tracks, and a third conveying section comprises at least one second feeding track. The second feeding track connects the second order-picking station to the second retrieval distribution track and transports the loads to the second order-picking station.

The second retrieval distribution track is preferably formed by a closed second retrieval circular conveying track (retrieval loop), by which a number of second retrieval tracks are connected, which lead away from the retrieval vertical conveying devices. The retrieved loads may be distributed from the second retrieval circular conveying track (retrieval loop) to one or multiple second order-picking stations.

The first/second retrieval track, the first/second retrieval distribution track and the first/second feeding track each comprise conveying devices, such as belt conveyors, roller conveyors, and the like.

Transfer of the loads from the first/second retrieval track onto the first/second retrieval distribution track and transfer from the first/second retrieval distribution track onto the first/second feeding track may be enabled by means of infeed and outfeed devices. The infeed and outfeed devices may, for example, comprise strap offsets, skate wheel transfers, and the like.

At this point, it should be noted that a distribution track or circular conveying track (loop) does not need to only serve for storage or retrieval but may also perform both functions, thus forming a combined storage/retrieval distribution track or a combined storage/retrieval circular conveying track (storage/retrieval loop). This combined storage/retrieval distribution track or storage/retrieval circular conveying track (storage/retrieval loop) may replace the aforementioned retrieval distribution track/retrieval circular conveying track (retrieval loop) and the aforementioned storage distribution track/storage circular conveying track (storage loop). However, storage conveying sections of the storage conveying system leading away from the combined storage/retrieval circular conveying track may still serve for storing loads, and retrieval conveying sections of the retrieval conveying system leading to the combined storage/retrieval distribution track or the storage/retrieval circular conveying track may still exclusively serve for retrieving loads.

Other advantageous embodiments and further developments of the invention can now be gathered from the description in combination with the figures.

It is advantageous if the retrieval conveying system comprises a first retrieval conveying device, which is associated with a first retrieval transport platform of the retrieval transport platforms and with a second retrieval transport platform of the retrieval transport platforms and accessible by the first retrieval transport platform and by the second retrieval transport platform for retrieving a load. This means that in this embodiment, the storage arrangement comprises only one (single) retrieval conveying device. Thus, the loads are transported by the retrieval transport platforms from the retrieval provisioning devices to the (single) retrieval conveying device. The (multiple) retrieval transport platforms are movable independently of one another and controlled by the control system.

In addition, it is advantageous if the retrieval conveying system comprises a first retrieval conveying device and a second retrieval conveying device, which are arranged in conveyor planes located one above the other, wherein the loads are transported via a first retrieval transport platform of the retrieval transport platforms or a second retrieval transport platform of the retrieval transport platforms from the retrieval provisioning devices to the first retrieval conveying device or from the retrieval provisioning devices to the second retrieval conveying device. This way, retrieval of loads onto the first retrieval conveying device and the second retrieval conveying device may be carried out in a flexible manner.

However, it is also advantageous if the retrieval conveying system comprises a first retrieval conveying device and a second retrieval conveying device, which are arranged in conveyor planes located one above the other, wherein
the first retrieval conveying device is associated with a first retrieval transport platform of the retrieval transport platforms and accessible by the first retrieval transport platform for retrieving a load, and wherein the second retrieval conveying device is associated with a second retrieval transport platform of the retrieval transport platforms and accessible by the second retrieval transport platform for retrieving a load.

In this embodiment, two retrieval conveying devices are provided, which are fixedly associated with the retrieval transport platforms. The loads may thus be transported by the first retrieval transport platform from the retrieval provisioning devices to the first retrieval conveying device or by the second retrieval transport platform from the retrieval provisioning devices to the second retrieval conveying device. The (multiple) retrieval transport platforms are again movable independently of one another and controlled by the control system.

It is also advantageous if the retrieval conveying system comprises a first retrieval conveying device and a second retrieval conveying device, which are arranged in conveyor planes located one above the other, wherein the first retrieval conveying device may either be associated with a first retrieval transport platform of the retrieval transport platforms or with a second retrieval transport platform of the retrieval transport platforms and is accessible by the first or the second retrieval transport platform for retrieving a load, and wherein the second retrieval conveying device may either be associated with the first retrieval transport platform of the retrieval transport platforms or with the second retrieval transport platform of the retrieval transport platforms and is accessible by the first or the second retrieval transport platform for retrieving a load.

In this embodiment, two retrieval conveying devices are provided, which are fixedly associated with the retrieval transport platforms. The loads may thus be transported by the first retrieval transport platform or the second retrieval transport platform from the retrieval provisioning devices either to the first retrieval conveying device or to a second retrieval conveying device. The (multiple) retrieval transport platforms are again movable independently of one another and controlled by the control system.

Moreover, it is particularly advantageous if the first retrieval conveying device and the second retrieval conveying device are connected in terms of conveyance to each other. This way, any one of the retrieval transport platforms may be used for retrieving a load (provided that the load is within the access area of the selected retrieval transport platform), even if the load is supposed to be transported on a particular one of the retrieval conveying devices. This means that even if the first retrieval transport platform can only service some of a number of storage planes and the second retrieval transport platform can only service some of a number of storage planes, the conveying stream may, via the conveyor connection between the first retrieval conveying device and the second retrieval conveying device, be diverted from the first retrieval conveying device to the second retrieval conveying device or from the second retrieval conveying device to the first retrieval conveying device as required.

This way, loads may be released onto a second retrieval conveying device and subsequently be transported to a first order-picking station, which is primarily connected in terms of conveyance to the first retrieval conveying device. Accordingly, loads may be released onto a first retrieval conveying device and subsequently be transported to a second order-picking station, which is primarily connected in terms of conveyance to the second retrieval conveying device. Accordingly, the loads may also be retrieved "randomly"; i.e. one of the retrieval transport platforms may be picked randomly for retrieval if the load is within the access area of the selected retrieval transport platform. Accordingly, the presented embodiment also supports "random" storage, i.e. randomly selecting a storage place for a load to be stored. The control effort for the storage arrangement may thus be kept particularly small.

The conveyor connection between the first retrieval conveying device and the second retrieval conveying device may comprise conveying devices with a simple structure. The conveying devices each comprise, for example, a belt conveyor, a roller conveyor, an outfeed conveyor, an infeed conveyor, and the like, or a vertical conveying device. Belt conveyors are particularly suitable for compensating the height between the first retrieval conveying device and the second retrieval conveying device. Basically, the conveyor connection between the first retrieval conveying device and the second retrieval conveying device may also comprise one single conveying device, which is formed, for example, by a vertical conveying device, in particular by a spiral conveyor, a vertical lift, or the like. This single conveying device may nevertheless serve as a mutual conveyor connection between the storage conveying devices and between the retrieval conveying devices or between the distribution tracks if it is operable in multiple conveying directions.

According to a particularly preferred embodiment, the conveyor connection between the first retrieval conveying device and the second retrieval conveying device is arranged in the area of the second conveying section, i.e. between a first retrieval distribution track/circular conveying track and a second retrieval distribution track/circular conveying track. This embodiment has a particularly favorable effect if multiple retrieval vertical conveying devices are provided and the retrieval tracks are connected by the first/second retrieval distribution track/circular conveying track, as one single conveyor connection between the first retrieval conveying device and the second retrieval conveying device is sufficient. The structure of the conveying system is simplified. However, this does not exclude (another) conveyor connection from being provided between the first retrieval track and the second retrieval track for each retrieval vertical conveying device as well.

However, an embodiment is also possible according to which the conveyor connection between the first retrieval conveying device and the second retrieval conveying device is arranged in the area of the first conveying section, in particular between the first retrieval track and the second retrieval track. This embodiment is used when one single retrieval vertical conveying device is provided, for example.

It is favorable if the conveyor connection between the first retrieval conveying device and the second retrieval conveying device comprises a joining of the first retrieval conveying device and the second retrieval conveying device. Accordingly, the number of retrieval conveying devices after said conveyor connection is reduced. The structure of the storage arrangement is thus further simplified by providing a joining.

Furthermore, it is particularly advantageous if the conveyor connection between the first retrieval conveying device and the second retrieval conveying device is mutual. In other words, by means of the conveyor connection, the first retrieval conveying device is connected to the second retrieval conveying device, and the second retrieval conveying device is connected to the first retrieval conveying device. Or, one could also say that an outcrossing is provided between the first retrieval conveying device and the second retrieval conveying device.

The process sequence enabled by this storage arrangement may thus be particularly flexible. For example, both a load released from a first retrieval transport platform onto the first retrieval conveying device may be transferred onto the second retrieval conveying device, and a load released from a second retrieval transport platform onto the second retrieval conveying device may be transferred onto the first retrieval conveying device.

By the measures suggested above, an advantageous version of the method is enabled where some of the loads, while they are transported away, are transferred from a first retrieval conveying device of the retrieval conveying system onto a second retrieval conveying device of the retrieval conveying system, and/or some of the loads, while they are transported away, are transferred from the second retrieval conveying device onto the first retrieval conveying device. The conveyor connection between the retrieval conveying devices enables transferring of the retrieved loads from the first retrieval conveying device onto the second retrieval conveying device and/or vice versa as required.

It is further advantageous if the storage conveying system comprises a first storage conveying device, which is associated with a first storage transport platform of the storage transport platforms and with a second storage transport platform of the storage transport platforms and accessible by the first storage transport platform and by the second transport platform for storing a load. Thus, in this embodiment, the storage arrangement comprises only one (single) storage conveying device. The loads are thus transported by the storage transport platforms from the (single) storage conveying device to the storage provisioning devices. The (multiple) storage transport platforms are movable independently of one another and controlled by the control system.

In addition, it is advantageous if the storage conveying system comprises a first storage conveying device and a second storage conveying device, which are arranged in conveyor planes located one above the other, wherein the loads are transported via a first storage transport platform of the storage transport platforms or a second storage transport platform of the storage transport platforms from the first storage conveying device to the storage provisioning devices or from the second storage conveying device to the storage provisioning devices. This way, storing loads from the first storage conveying device and from the second storage conveying device may be carried out in a flexible manner.

However, it is also advantageous if the storage conveying system comprises a first storage conveying device and a second storage conveying device, which are arranged in conveyor planes located one above the other, wherein
the first storage conveying device is associated with a first storage transport platform of the storage transport platforms and accessible by the first storage transport platform for storing a load, and wherein
the second storage conveying device is associated with a second storage transport platform of the storage transport platforms and accessible by the second storage transport platform for storing a load.

In this embodiment, two storage conveying devices are provided, which are fixedly associated with the storage transport platforms. The loads may thus be transported by the first storage transport platform from the first storage conveying device to the storage provisioning devices or by the second storage transport platform from the second storage conveying device to the storage provisioning devices. The (multiple) storage transport platforms are again movable independently of one another and controlled by the control system.

In addition, it is advantageous if the storage conveying system comprises a first storage conveying device and a second storage conveying device, which are arranged in conveyor planes located one above the other, wherein
the first storage conveying device may either be associated with a first storage transport platform of the storage transport platforms or with a second storage transport platform of the storage transport platforms and is accessible by the first or the second storage transport platform for storing a load, and wherein
the second storage conveying device may either be associated with the first storage transport platform of the storage transport platforms or with the second storage transport platform of the storage transport platforms and is accessible by the first or the second storage transport platform for storing a load.

In this embodiment, two storage conveying devices are provided, which are fixedly associated with the storage transport platforms. The loads may thus be transported by the first storage transport platform or the second storage transport platform either from the first storage conveying device or the second storage conveying device to the storage provisioning devices. The (multiple) storage transport platforms are again movable independently of one another and controlled by the control system.

Furthermore, it is particularly advantageous if the first storage conveying device and/or the second storage conveying device and/or the first retrieval conveying device and/or the second retrieval conveying device are arranged in the middle third of the vertical extension of the first or the second storage rack. This way, loads may be stored and/or retrieved particularly efficiently since the paths to be traveled by the transport platforms during this process are relatively short.

Advantageously, an order-picking system comprises a storage arrangement of the above-mentioned type and a first order-picking station and a second order-picking station, which are each connected in terms of conveyance both to the first retrieval conveying device and to the second retrieval conveying device via the conveyor connection between the first retrieval conveying device and the second retrieval conveying device. This way, the retrieval of loads may be decoupled from an allocation to a particular order-picking station.

In general, it is advantageous if
an evaluation unit (which may be part of the control unit) determines and compares a first storage parameter for a first storage zone of the rack arrangement and a second storage parameter for a second storage zone of the rack arrangement, wherein the first storage parameter is defined by the ratio between available storage places and occupied storage places in the first storage zone, and the second storage parameter is defined by the ratio between available storage places and occupied storage places in the second storage zone, and wherein the first storage zone has a different vertical extension than the second storage zone, and
the loads are stored into the rack arrangement in respect of mutually adapting storage parameters in the first storage zone and in the second storage zone.

This way, unbalanced utilization of the storage places in a first storage zone and in a second storage zone and a resulting unbalanced load may be prevented, and balanced utilization of the retrieval provisioning devices, the storage and retrieval devices, the retrieval transport platforms and the retrieval conveying devices during retrieval of loads may be achieved. A difference between the first storage parameter and the second storage parameter may be determined, for example, by calculating the difference or by calculating a quotient between the first storage parameter and the second storage parameter. The storage zones are defined by a "logical" separation. Thus, a "logical" separation is not of structural nature. For example, the storage zone beneath the "logical" separation is a first storage zone and comprises a number of storage planes, and the storage zone above the "logical" separation is a second storage zone and comprises a number of storage planes. The number of storage places in the first storage zone and in the second storage zone may in particular be identical. In this case, the quotient between the first storage parameter and the second storage parameter corresponds to the quotient between the number of loads stored in the first storage zone and the number of loads stored in the second storage zone. The storage zones may each comprise one single storage plane or a plurality of storage planes. The allocation of the storage zones may be static or dynamic (i.e. the storage zones change their sizes and/or positions over time).

In general, the storage zones may be separate from one another or overlap. If an overlapping area is present, the storage parameters are mutually influenced.

Moreover, it is particularly advantageous if the control system, for controlling the first storage transport platform and the second storage transport platform in a first operating mode, is configured such that the storage movement areas of the first storage transport platform and the second storage transport platform vertically overlap during storage of loads, and for controlling the first retrieval transport platform and the second retrieval transport platform in the first operating mode, is configured such that the retrieval movement areas of the first retrieval transport platform and the second retrieval transport platform are always vertically separate from one another during retrieval of loads.

Accordingly, a method is advantageous in which the control system controls a first storage transport platform and a second storage transport platform in a first operating mode such that the storage movement areas of the first storage transport platform and the second storage transport platform vertically overlap during storage of loads, and the control system controls a first retrieval transport platform and a second retrieval transport platform in the first operating mode such that the retrieval movement areas of the first retrieval transport platform and the second retrieval transport platform are always vertically separate from one another during retrieval of loads.

In this regard, one takes advantage of the fact that the allocation of the storage places to the loads to be stored may usually be more flexible than the allocation of a load to be retrieved to one of multiple order-picking stations that are connected in terms of conveyance to the retrieval conveying system. Moreover, after a corresponding request, retrieval of a load must usually be performed faster than storage (reaction time). In addition, the complete amount of time available for storing the loads may be greater than the time available for retrieving the loads (process time).

In other words, one takes advantage of the fact that during storage of a load, usually any one of the unoccupied storage places may be used, especially if the loads are stored in a storage arrangement in an unordered manner. This is accounted for by the fact that the storage movement areas overlap and have a storage overlapping area. Consequently, one storage transport platform may cover a comparatively large area of storage planes.

As opposed to storage, during retrieval, a particular storage place is accessed on which the required load is stored. In addition, the retrieval process is usually more time-critical than the storage process as the time between the order of a load and the delivery must be short. This is accounted for by the fact that the retrieval movement areas are separate from one another and do not have an overlapping area. The retrieval transport platforms may therefore be moved without influencing one another and at high speed within the associated retrieval movement areas.

In another particularly advantageously embodiment of the method, an evaluation unit determines and compares a first storage parameter for a first storage zone of the rack arrangement and a second storage parameter for a second storage zone of the rack arrangement, wherein the first storage parameter is defined by the ratio between available storage places and occupied storage places in the first storage zone, and the second storage parameter is defined by the ratio between available storage places and occupied storage places in the second storage zone, and wherein the first storage zone has a different vertical extension than the second storage zone, the control system operates the first storage transport platform and the second storage transport platform in the first operating mode if a difference between the first storage parameter and the second storage parameter lies above a first threshold (and hence the occupancy of the storage zones is uneven or, in other words, the storage zones are unbalanced with regard to their occupancy), the control system operates the first storage transport platform and the second storage transport platform in a second operating mode if a difference between the first storage parameter and the second storage parameter lies below the first threshold or below a second threshold, which lies below the first threshold (and hence the occupancy of the storage zones is substantially even or, in other words, the storage zones are substantially balanced with regard to their occupancy), wherein the storage movement areas of the first storage transport platform and the second storage transport platform are vertically separate from one another in the second operating mode during storage of loads, and the retrieval movement areas of the first retrieval transport platform and the second retrieval transport platform are always vertically separate from one another during retrieval in the second operating mode and irrespectively of a storage parameter.

In other words, the overlap of the movement areas of the storage transport platforms is used for mutually adapting storage parameters in the first storage zone and in the second storage zone, i.e. for mutually adjusting a relative occupancy of the storage zones with loads.

By the measures suggested, unbalanced utilization of the storage places in a first storage zone and in a second storage zone and a resulting unbalanced load may be prevented, and balanced utilization of the retrieval provisioning devices, the storage and retrieval devices, the retrieval transport platforms and the retrieval conveying devices during retrieval of loads may be achieved. A difference between the first storage parameter and the second storage parameter may again be determined, for example, by calculating the difference or by calculating a quotient between the first storage parameter and the second storage parameter. The storage zones are again defined by a "logical" separation. For example, the storage zone beneath the "logical" separation is a first storage zone and comprises a number of storage planes, and the storage zone above the "logical" separation is a second storage zone and comprises a number of storage planes. The number of storage places in the first storage zone and in the second storage zone may in particular be identical. In this case, the quotient between the first storage parameter and the second storage parameter corresponds to the quotient between the number of loads stored in the first storage zone and the number of loads stored in the second storage zone. The storage zones may each comprise one single storage plane or a plurality of storage planes. The allocation of the storage zones may again be static or dynamic (i.e. the storage zones change their sizes and/or positions over time).

Advantageously, the variation is used where switching into the second operating mode is carried out if a difference between the first storage parameter and the second storage parameter lies below a second threshold, which lies below the first threshold. The hysteresis provided in this case prevents too frequent switching between the first and the second operating modes. Basically, however, the variation may also be used where switching into the second operating mode is carried out if a difference between the first storage parameter and the second storage parameter lies below the first threshold, i.e. no hysteresis is provided.

Like the storage zones, the storage movement areas may be separate from one another or overlap.

In addition, it is advantageous if the control system operates the first retrieval transport platform and the second retrieval transport platform in the first operating mode or in the second operating mode if operating ability of the first retrieval transport platform and the second retrieval transport platform and of the first retrieval conveying device and the second retrieval conveying device is determined by a diagnostic unit (or if the operating ability is not impaired). In other words, the retrieval transport platforms are operated with separate retrieval movement areas, irrespective of whether the storage movement areas are also separate from one another or if they overlap.

Moreover, it is particularly advantageous if the control system operates the first retrieval transport platform and the second retrieval transport platform in a third operating mode or in a fourth operating mode if an impairment of the operating ability of the first retrieval transport platform or the second retrieval transport platform or of the first retrieval conveying device or the second retrieval conveying device is determined by a diagnostic unit (or if operating ability is no longer present), wherein
- the retrieval movement areas of the first retrieval transport platform and the second retrieval transport platform vertically overlap both in the third operating mode and in the fourth operating mode during retrieval of loads,
- the storage movement areas of the first storage transport platform and the second storage transport platform vertically overlap in the third operating mode during storage of loads, and
- the storage movement areas of the first storage transport platform and the second storage transport platform are vertically separate from one another in the fourth operating mode during storage of loads.

In this variation of the method presented, in the event of malfunctions, the multiple arrangement of retrieval transport platforms and/or retrieval conveying devices is exploited by lifting the strict separation of the movement areas for the retrieval transport platforms in the event of malfunctions in order to maintain automated warehouse operation even if one of the retrieval transport platforms and/or one of the retrieval conveying devices fails. For example, the (lower) first retrieval transport platform may access the (upper) second retrieval conveying device if the (lower) first retrieval conveying device is blocked, and so forth.

Depending on whether the function of the first retrieval transport platform or the second retrieval transport platform is impaired,
- the first retrieval conveying device may either be associated with the first retrieval transport platform of the retrieval transport platforms or with the second retrieval transport platform of the retrieval transport platforms and be accessed by the first retrieval transport platform or the second retrieval transport platform for retrieving/transporting away a load, or
- the second retrieval conveying device may either be associated with the first retrieval transport platform of the retrieval transport platforms or with the second retrieval transport platform of the retrieval transport platforms and be accessed by the first retrieval transport platform or the second retrieval transport platform for retrieving/transporting away a load.

Depending on whether the function of the first retrieval conveying device or the second retrieval conveying device is impaired,
- the first retrieval transport platform may either be associated with the first retrieval conveying device or with the second retrieval conveying device and be accessed by the first retrieval transport platform for retrieving/transporting away a load, or
- the second retrieval transport platform may either be associated with the first retrieval conveying device or with the second retrieval conveying device and be accessed by the second retrieval transport platform for retrieving/transporting away a load.

It is further favorable if
- an evaluation unit determines and compares a first storage parameter for a first storage zone of the rack arrangement and a second storage parameter for a second storage zone of the rack arrangement, wherein the first storage parameter is defined by the ratio between available storage places and occupied storage places in the first storage zone, and the second storage parameter is defined by the ratio between available storage places and occupied storage places in the second storage zone, and wherein the first storage zone has a different vertical extension than the second storage zone,
- the control system operates the first storage transport platform and the second storage transport platform in the third operating mode if a difference between the first storage parameter and the second storage parameter lies above a first threshold (and hence the occupancy of the storage zones is uneven or, in other words, the storage zones are unbalanced with regard to their occupancy),
- the control system operates the first storage transport platform and the second storage transport platform in a fourth operating mode if a difference between the first storage parameter and the second storage parameter lies below the first threshold or below a second threshold, which lies below the first threshold (and hence the occupancy of the storage zones is substantially even or, in other words, the storage zones are substantially balanced with regard to their occupancy).

In this embodiment, the measures provided on the storage side in the first and second operating modes are transferred to the third and fourth operating modes. On the storage side, the third operating mode thus corresponds to the first operating mode, and the fourth operating mode corresponds to the second operating mode.

It is also advantageous if the storage movement area of the first storage transport platform (especially in the second and fourth operating modes) is associated with the storage planes of the first storage zone, and the storage movement area of the second storage transport platform (especially in the second and fourth operating modes) is associated with the storage planes of the second storage zone.

This way, the storage parameters do not only refer to the storage zones but also to the storage movement areas of the storage transport platforms. The storage process or the control effort required beforehand may be further simplified this way.

It is particularly advantageous if
the first storage movement area is maintained when a change from the second operating mode into the first operating mode or from the fourth operating mode into the third operating mode occurs and the second storage movement area is extended to the first storage movement area if the second storage zone is excessively occupied by loads in the second/fourth operating mode compared to the first storage zone. The above-mentioned change of state hence concerns a change from an operating mode in which the storage movement areas are separate from one another into an operating mode in which the storage movement areas overlap. In this embodiment, the second storage movement area after said change thus comprises the first storage movement area valid in the second/fourth operating mode and the second storage movement area valid in the second/fourth operating mode, if applicable minus a storage plane that cannot be reached by the second storage transport platform in the first storage movement area for constructional reasons.

It is particularly advantageous if
the second storage movement area is maintained when a change from the second operating mode into the first operating mode or from the fourth operating mode into the third operating mode occurs and the first storage movement area is extended to the second storage movement area if the first storage zone is excessively occupied by loads in the second/fourth operating mode compared to the second storage zone. The above-mentioned change of state hence also concerns a change from an operating mode in which the storage movement areas are separate from one another into an operating mode in which the storage movement areas overlap. In this embodiment, the first storage movement area after said change thus comprises the first storage movement area valid in the second/fourth operating mode and the second storage movement area valid in the second/fourth operating mode, if applicable minus a storage plane that cannot be reached by the first storage transport platform in the second storage movement area for constructional reasons.

It is also particularly advantageous if
the first storage movement area, after a change from the first operating mode into the second operating mode or from the third operating mode into the fourth operating mode (no overlap of the storage movement areas), corresponds to the first storage movement area prior to a change from the second operating mode into the first operating mode/from the fourth operating mode into the third operating mode, and
the second storage movement area, after a change from the first operating mode into the second operating mode or from the third operating mode into the fourth operating mode (no overlap of the storage movement areas), corresponds to the second storage movement area prior to a change from the second operating mode into the first operating mode/from the fourth operating mode into the third operating mode.

In other words, after a change from the first operating mode into the second operating mode or from the third operating mode into the fourth operating mode, the first storage movement area and the second storage movement area are switched back to their original sizes.

In general, it is favorable if the loads are randomly stored into the rack arrangement within the first storage zone and/or within the second storage zone. This way, the control effort for storing the loads may be kept small.

In general, it is also advantageous if the loads to be stored into the rack arrangement are randomly and/or evenly distributed to a first storage conveying device and a second storage conveying device of the storage conveying system. This way, the control effort for conveying the loads may be kept small. Thus, a "Y-piece" exists in the storage conveying system, by means of which loads may be transferred either onto the first storage conveying device or onto the second storage conveying device. Alternatively or additionally, a mutual conveyor connection between the first storage conveying device and the second storage conveying device may be utilized for this purpose as well.

Thus, the operating modes may be summed up as follows with regard to the arrangement of the storage movement areas and the retrieval movement areas:

|  | Storage side | Retrieval side |
| --- | --- | --- |
| First operating mode | movement areas overlap | no overlap |
| Second operating mode | no overlap | no overlap |
| Third operating mode | movement areas overlap | movement areas overlap |
| Fourth operating mode | no overlap | movement areas overlap |

Furthermore, the operating modes may be summed up as follows with regard to the basis for selecting a particular operating mode:

|  | Storage zones | Retrieval side |
| --- | --- | --- |
| First operating mode | unequal filling degree | flawless functioning |
| Second operating mode | equal filling degree | flawless functioning |
| Third operating mode | unequal filling degree | functional impairment |
| Fourth operating mode | equal filling degree | functional impairment |

At this point, it should be noted that the variations and advantages disclosed with regard to the presented storage arrangement/rack arrangement and with regard to the presented order-picking system equally relate to the presented method and vice versa.

BRIEF DESCRIPTION OF DRAWINGS

For better understanding of the invention, the latter is explained in detail with reference to the following figures.

The following is shown in highly simplified, schematic representation.

DETAILED DESCRIPTION OF PREFERRED EMBODIMENTS

First of all, it should be noted that in the embodiments described in different ways, identical parts are given identical reference numbers or identical component names, and the disclosures contained in the entire description may be correspondingly applied to identical parts with identical reference numbers or identical component names. Moreover, the position indications used in the description, such as at the top, at the bottom, lateral, etc. directly refer to the figure illustrated and described, and, if a position changes, said position indications are to be correspondingly applied to the new position.

Figure 1:
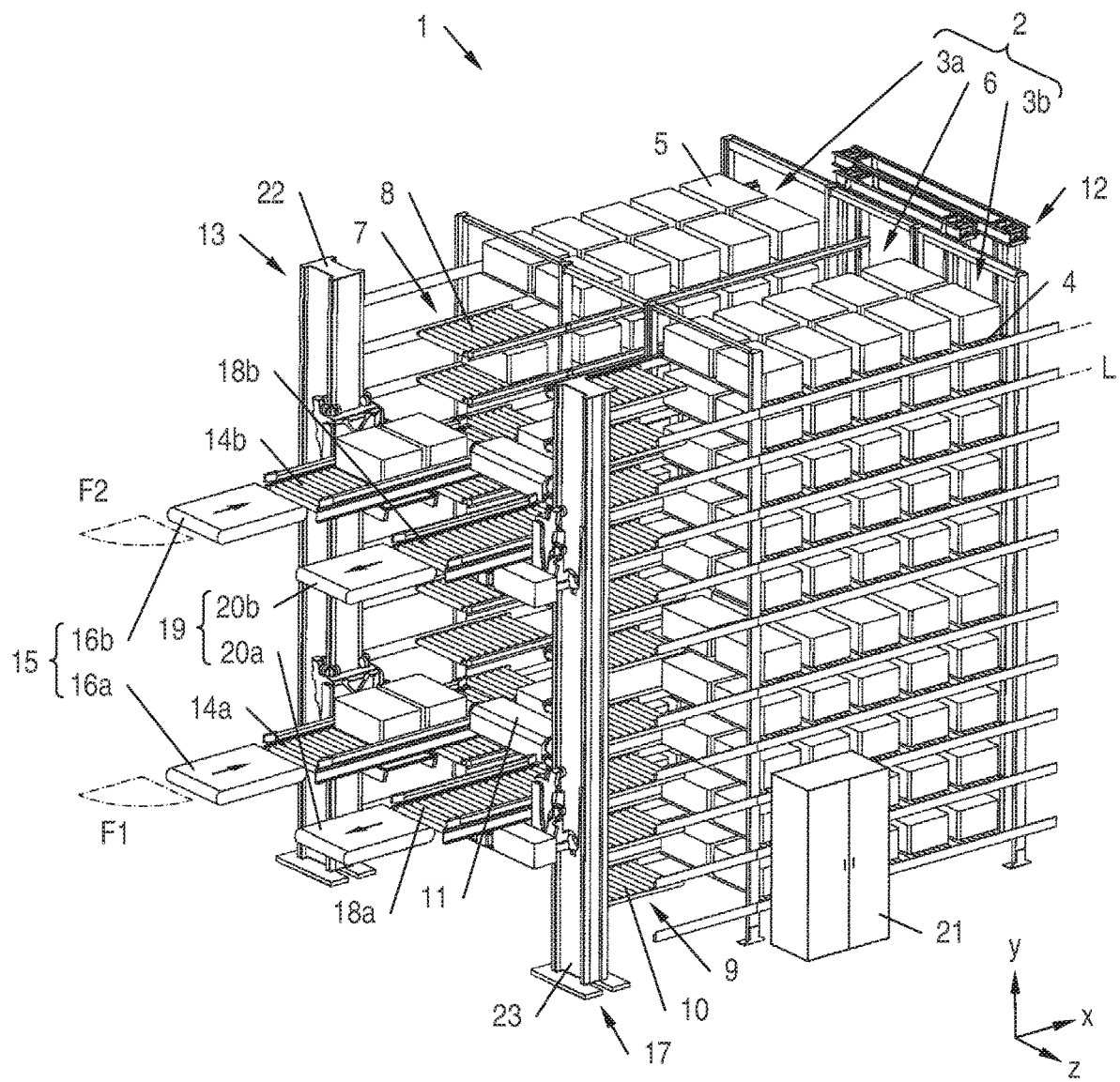
FIG. 1 oblique view of a schematic representation of a storage arrangement with a rack arrangement.

FIG. 1 is an oblique view of an exemplary storage arrangement 1. The storage arrangement 1 comprises a rack arrangement 2 having a first storage rack 3a and a second storage rack 3b, each having storage places 4 for loads 5, wherein the storage places 4 are arranged in storage planes L located one above the other. The rack arrangement 2 also comprises a rack aisle 6 between the first storage rack 3a and the second storage rack 3b.

The storage arrangement 1 further comprises a storage buffer device 7 having storage provisioning devices 8 arranged in provisioning planes located one above the other and each configured for interim buffering of a load 5 or multiple loads 5. In this example, each provisioning plane is respectively associated with one storage plane L and therefore does not bear a separate reference number. Basically, however, a different association would be possible as well.

The storage arrangement 1 further comprises a retrieval buffer device 9 having retrieval provisioning devices 10 arranged in provisioning planes located one above the other and each configured for interim buffering of a load 5 or multiple loads 5 as well. In this example, each provisioning plane is respectively associated with one storage plane L. Basically, however, a different association would be possible here as well.

The storage arrangement 1 further comprises storage and retrieval devices 11, which are each movable on a horizontal travel plane in the rack aisle 6 in front of the storage places 4, in front of the storage provisioning devices 8 and in front of the retrieval provisioning devices 10. The storage and retrieval devices 11 each have a load receiving device and are configured for transporting the loads 5 from the storage provisioning devices 8 to the storage places 4 and for transporting the loads 5 from the storage places 4 to the retrieval provisioning devices 10. In other words, the conveyor connection between the storage provisioning devices 8 and the storage places 4 and the conveyor connection between the storage places 4 and the retrieval provisioning devices 10 is provided via the storage and retrieval devices 11. In this example, each travel plane is respectively associated with one storage plane L and therefore does not bear a separate reference number; however, there are less storage and retrieval devices 11 than travel planes. In this example, the storage and retrieval devices 11 may be moved from one travel plane to another travel plane by means of a storage and retrieval device lifter 12, which is not illustrated in detail. However, a storage and retrieval device 11 may also be present on each travel plane, so that the storage and retrieval device lifter 12 may be omitted.

The storage arrangement 1 further comprises a storage vertical conveying device 13 associated with the rack aisle 6 and having multiple storage transport platforms 14a, 14b, which are controllable independently of one another and each movable in a storage movement area E1, E2 (see FIGS. 4 to 7) relative to the provisioning planes and a storage conveying system 15 associated with the rack aisle 6 and connected in terms of conveyance to the storage vertical conveying device 13 for transporting loads 5 to the storage vertical conveying device 13. In this regard, the loads 5 may be transported by means of the storage transport platforms 14a, 14b from the storage conveying system 15 to the storage provisioning devices 8. By means of the storage transport platforms 14a, 14b, the loads 5 are not only movable vertically but also horizontally. For this purpose, the storage transport platforms 14a, 14b each have a transport device, in this example roller conveyors. However, using conveyor bands, for example, would be possible as well.

In this example, the storage conveying system 15 comprises a first storage conveying device 16a in a first conveyor plane F1 and a second storage conveying device 16b in a second conveyor plane F2. However, it would also be conceivable for the storage conveying system 15 to have only one storage conveying device 16a. The latter may particularly be arranged on the height level of the lowest storage plane L. The storage conveying devices 16a, 16b are configured as simple storage tracks here, but they may also have a more complex design (see also FIGS. 2 and 3).

The storage arrangement 1 also comprises a retrieval vertical conveying device 17 associated with the rack aisle 6 and having multiple retrieval transport platforms 18a, 18b, which are controllable independently of one another and each movable in a retrieval movement area A1, A2 (see FIGS. 4 to 7) relative to the provisioning planes and a retrieval conveying system 19 associated with the rack aisle 6 and connected in terms of conveyance to the retrieval vertical conveying device 17 for transporting loads 5 away from the retrieval vertical conveying device 17, wherein the loads 5 are transportable by means of the retrieval transport platforms 18a, 18b from the retrieval provisioning devices 10 to the retrieval conveying system 19. By means of the retrieval transport platforms 18a, 18b, the loads 5 are not only movable vertically but also horizontally. For this purpose, the retrieval transport platforms 18a, 18b each have a transport device, in this example roller conveyors. However, using conveyor bands, for example, would be possible as well.

In this example, the retrieval conveying system 19 comprises a first retrieval conveying device 20a in the first conveyor plane F1 and a second retrieval conveying device 20b in the second conveyor plane F2. However, it would also be conceivable for the retrieval conveying system 19 to have only one retrieval conveying device 20a. The latter may particularly be arranged on the height level of the lowest storage plane L. The retrieval conveying devices 20a, 20b are configured as simple retrieval tracks here, but they may also have a more complex design (see also FIGS. 2 and 3).

Finally, the storage arrangement 1 comprises a control system 21, by means of which the storage transport platforms 14a, 14b are controlled independently of one another and by means of which the retrieval transport platforms 18a, 18b may be controlled independently of one another. In addition, the storage transport platforms 14a, 14b may be controlled by the control system 21 independently of the retrieval transport platforms 18a, 18b, and vice versa. In FIG. 1, the control system 21 is symbolically illustrated as a control cabinet, which has a wired or wireless connection to the actuators and sensors of the storage arrangement 1. However, it may of course also appear in a different design. The control system 21 may particularly also comprise a storage control unit and a retrieval control unit separate therefrom.

In the example shown, the storage buffer device 7 is arranged between the first storage rack 3a and the storage vertical conveying device 13, and the retrieval buffer device 9 between the second storage rack 3b and the retrieval vertical conveying device 17. Basically, however, a different arrangement is conceivable as well; in particular, the storage side and the retrieval side may be interchanged.

The (multiple) storage transport platforms 14a, 14b are arranged vertically above one another at a storage guide assembly of the storage vertical conveying device 13 and may be moved by the control system 21 independently of one another. The storage guide assembly for the storage transport platforms 14a, 14b may be formed at a stationary storage vertical mast 22, in particular at one single storage vertical mast 22, as is the case in FIG. 1.

The (multiple) retrieval transport platforms 18a, 18b are arranged vertically above one another at a retrieval guide assembly of the retrieval vertical conveying device 17 and may be moved by the control system 21 independently of one another. The retrieval guide assembly for the retrieval transport platforms 18a, 18b may be formed at a stationary storage vertical mast 23, in particular at one single storage vertical mast 23, as is the case in FIG. 1.

The storage vertical conveying device 13 may be structurally separate from the retrieval vertical conveying device 17, as is the case in the example illustrated. This means that there are no overlaps with regard to the mechanical components required for moving the storage transport platforms 14a, 14b and the retrieval transport platforms 18a, 18b. In other words, there is no joint use of the mechanical components required for moving the storage transport platforms 14a, 14b and the retrieval transport platforms 18a, 18b.

This way, the process of storing loads 5 and the process of retrieving loads 5 may be decoupled from one another by means of multiple storage transport platforms 14a, 14b and multiple retrieval transport platforms 18a, 18b, respectively.

The storage vertical conveying device 13 and the retrieval vertical conveying device 17 may be set up in a transverse direction z normally to the longitudinal extension x of the rack aisle 6 at a distance from one another or substantially at the same transverse position in the transverse direction z of the rack aisle 6. In addition, it is possible that the storage vertical conveying device 13 and the retrieval vertical conveying device 17 are arranged in the longitudinal direction x of the rack aisle 6 at a distance from one another or substantially at the same longitudinal position in the longitudinal direction x of the rack aisle 6.

The storage vertical conveying device 13 and the retrieval vertical conveying device 17 may in particular substantially be arranged at a distance of an aisle width between one another and arranged opposite of one another in a mirror-inverted manner, as is the case in FIG. 1.

It is also possible that the storage vertical conveying device 13 and the retrieval vertical conveying device 17 are arranged offset relative to one another in the longitudinal direction x of the rack aisle 6 and on the same side of the rack aisle 6 (not illustrated).

Finally, it is also possible that the storage vertical conveying device 13 and the retrieval vertical conveying device 17 are arranged at a distance of an aisle width between one another and arranged offset relative to one another in the longitudinal direction x of the rack aisle 6.

With regard to the above, the storage vertical mast 22 may in particular be structurally separate from the retrieval vertical mast 23, as already mentioned above. Preferably, in this case, the storage vertical mast 22 and the storage transport platforms 14a, 14b as well as the storage buffer device 7 are arranged on a first side in a transverse direction z normally to a longitudinal extension x of the rack aisle 6 and outside the rack aisle 6, and the retrieval vertical mast 23 and the retrieval transport platforms 18a, 18b as well as the retrieval buffer device 9 on a second side in the transverse direction z normally to the longitudinal extension x of the rack aisle 6 and outside the rack aisle 6.

However, it is also conceivable that the storage vertical mast 22 and the retrieval vertical mast 23 are combined and formed by one single storage and retrieval vertical mast (not illustrated). In this case, the storage transport platforms 14a, 14b as well as the storage buffer device 7 may be arranged on a first side in the transverse direction z normally to the longitudinal extension x of the rack aisle 6 and outside the rack aisle 6, and the retrieval transport platforms 18a, 18b as well as the retrieval buffer device 9 on a second side in the transverse direction z normally to the longitudinal extension x of the rack aisle 6 and outside the rack aisle 6. The (single) storage and retrieval vertical mast then forms a first guide assembly for the storage transport platforms 14a, 14b on a first side and a second guide assembly for the retrieval transport platforms 18a, 18b on a second side and may be arranged in the transverse direction z centrally in the rack aisle 6. Such an embodiment is particularly advantageous if the rack aisle 6 ends at the storage and retrieval vertical mast.

In general, one storage vertical conveying device 13 and/or one retrieval vertical conveying device 17 may be associated with exactly one rack aisle 6, as is the case in FIG. 1. However, it is also conceivable that one storage vertical conveying device 13 and/or one retrieval vertical conveying device 17 is associated with multiple rack aisles 6. For example, at one single storage vertical mast 22, storage transport platforms 14a, 14b may be arranged, which are associated with two rack aisles 6. For example, two storage transport platforms 14a, 14b arranged one above the other may be associated with a first rack aisle 6, and two other storage transport platforms arranged one above the other with a second rack aisle 6. Likewise, at one single retrieval vertical mast 23, retrieval transport platforms 18a, 18b may be arranged, which are associated with two rack aisles 6. For example, two retrieval transport platforms 18a, 18b arranged one above the other may be associated with a first rack aisle 6, and two other retrieval transport platforms arranged one above the other with a second rack aisle 6.

Advantageously, in the storage arrangement 1 illustrated, the storage movement areas E1, E2 do not overlap with the retrieval movement areas A1, A2 (see FIGS. 4 to 7). The storage transport platforms 14a, 14b and the retrieval transport platforms 18a, 18b are controlled by the control system 21 separately or independently of one another. This way, the process of storing loads 5 and the process of retrieving loads 5 may be carried out in parallel and decoupled from one another by means of multiple storage transport platforms 14a, 14b and multiple retrieval transport platforms 18a, 18b, respectively. The complexity of the control mechanism of the storage arrangement 1 and the control effort for the storage arrangement 1 may thus be reduced. In particular, as opposed to the prior art, loads 5 to be stored do not lead to blockages during retrieval of loads 5, and vice versa. This means that the storage transport platforms 14a, 14b and the retrieval transport platforms 18a, 18b are movable (with maximum speed of movement) within the storage movement areas E1, E2 and the retrieval movement areas A1, A2, respectively, without influencing one another.

Advantageously, not only the storage transport platforms 14a, 14b are moved independently of the retrieval transport platforms 18a, 18b, but the first storage transport platform 14a is also moved independently of the second storage transport platform 14b (if the storage movement areas E1, E2 do not overlap) and the first retrieval transport platform 18a independently of the second retrieval transport platform 14b (if the retrieval movement areas A1, A2 do not overlap).

Preferably, only the retrieval conveying system 19 is connected to the retrieval vertical conveying device 17 on the output side (i.e. in particular on an input side facing away from the retrieval buffer device 9), and only the storage conveying system 15 is connected to the storage vertical conveying device 13 on the input side (i.e. in particular on an output side facing away from the storage buffer device 7). This means that in this embodiment, the retrieval conveying system 19 is not connected to the storage vertical conveying device 13, and the storage conveying system 15 is not connected to the retrieval vertical conveying device 17. In this connection, it is also advantageous if the storage provisioning devices 8 of the storage buffer device 7 each (exclusively) serve for storing in all provisioning planes in which they are arranged, and the retrieval provisioning devices 10 of the retrieval buffer device 9 each (exclusively) serve for retrieving in all provisioning planes in which they are arranged. The conveying streams comprising a conveying stream with loads 5 to be stored and a conveying stream with loads 5 to be retrieved are therefore handled separately by the storage vertical conveying device 13 and the retrieval vertical conveying device 17.

Figure 2:
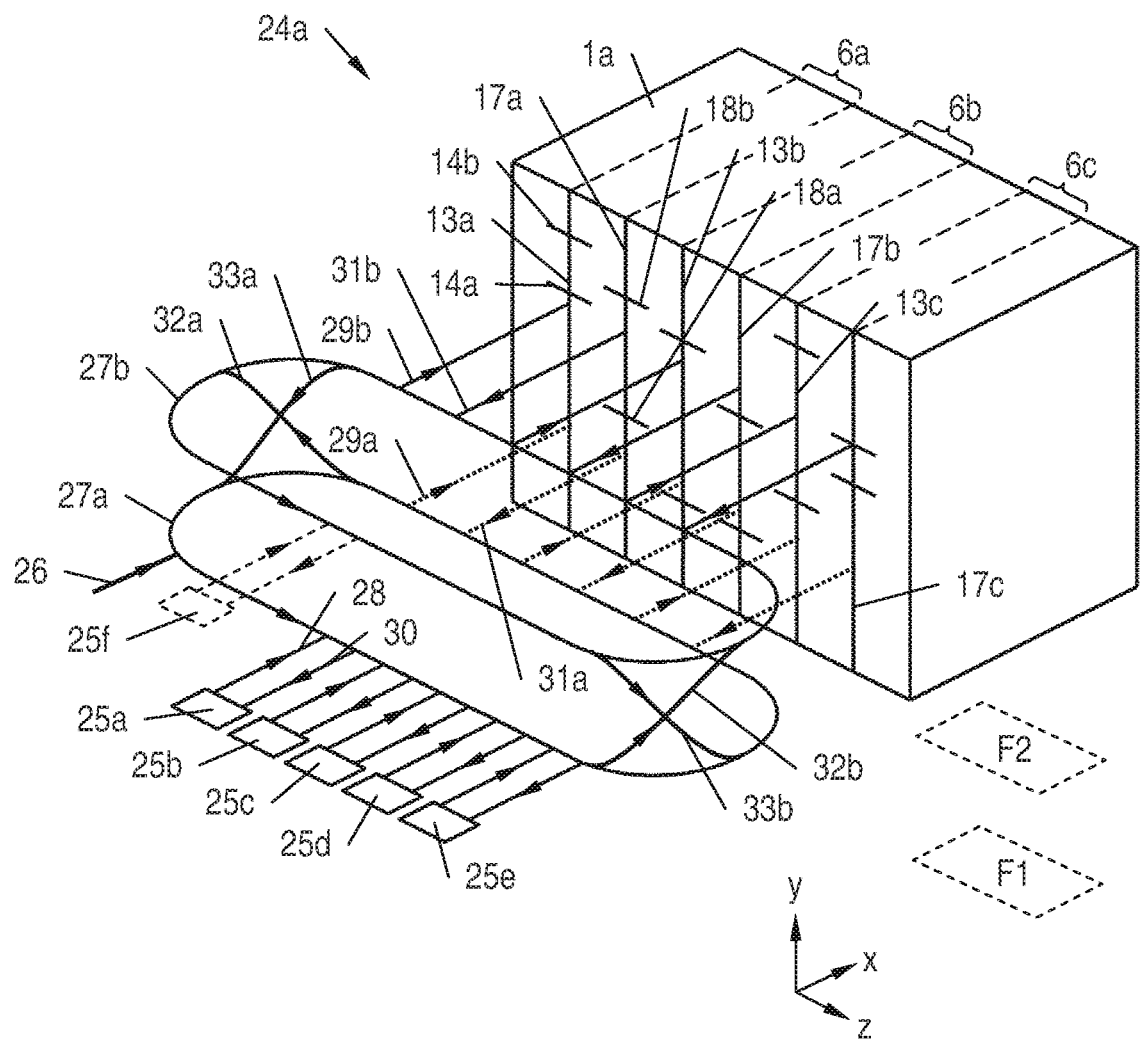
FIG. 2 oblique view of a first exemplary embodiment of an order-picking system, where the storage and retrieval conveying system is arranged in a rack aisle section of a rack aisle.

FIG. 2 now shows an exemplary order-picking system 24a with a storage arrangement 1a, with multiple merely symbolically illustrated storage vertical conveying devices 13a . . . 13c, multiple merely symbolically illustrated retrieval vertical conveying devices 17a . . . 17c and multiple rack arrangements 2, which are not illustrated in detail and have a plurality of rack aisles 6a . . . 6c and adjacent storage racks 3a, 3b. The storage arrangement 1a may thus be considered a multiplication of the storage arrangement 1 illustrated in FIG. 1. Specifically, the storage arrangement 1a of FIG. 2 comprises three storage arrangements 1 of FIG. 1 in series; however, any number of storage arrangements 1 could be provided. To give a better overview, only the storage transport platforms 14a, 14b of the first storage vertical conveying device 13a and the retrieval transport platforms 18a, 18b of the first retrieval vertical conveying device 17a are explicitly designated. Of course, the storage vertical conveying devices 13b, 13c also each have two storage transport platforms 14a, 14b, and the retrieval vertical conveying devices 17b, 17c each have two retrieval transport platforms 18a, 18b. The order-picking system 24a further comprises multiple order-picking stations 25a . . . 25f, which are connected in terms of conveyance to the storage arrangement 1a.

In the example illustrated in FIG. 2, the storage conveying system 15 is arranged in two conveyor planes F1, F2. In a first, lower conveyor plane F1, multiple conveying sections of the first storage conveying device 16a are provided, which are successively arranged in the storage conveying direction of the loads 5 (note: the conveying direction of the loads 5 is indicated with arrows in all figures), of which conveying sections an optional first conveying section comprises a first feeding track 26, a second conveying section comprises a first distribution track 27a, an optional third conveying section comprises multiple return conveying tracks 28, and a fourth conveying section comprises multiple first storage tracks 29a. Each first storage track 29a is respectively associated with one storage vertical conveying device 13a . . . 13c (note: the first storage tracks 29a of the first, lower conveyor plane F1 are indicated with dotted lines in FIG. 2 to better highlight their course. However, the use of dotted lines has no particular meaning beyond that). The first feeding track 26 is connected to the first distribution track 27a and delivers the loads 5 from an incoming goods department, which is not explicitly illustrated in FIG. 2. The first storage tracks 29a are connected to the first distribution track 27a and transport the loads 5 to the respective storage vertical conveying device 13a . . . 13c. The return conveying tracks 28 connect the order-picking stations 25a . . . 25e to the first distribution track 27a and transport loads 5 (which are not required for an order) away from the order-picking stations 25a . . . 25e after a picking process.

In this example, the first distribution track 27a is advantageously formed by a closed first circular conveying track (loop), by means of which the first feeding track 26, multiple return conveying tracks 28 and multiple first storage tracks 29a are connected in terms of conveyance to each other. However, this is not a compulsory requirement for the invention, and an open first distribution track 27a may be provided as well.

In a second, upper storage conveyor plane F2, multiple storage conveying sections of a second storage conveying device 16b are also provided, which are successively arranged in the storage conveying direction of the loads 5, of which storage conveying sections a first conveying section may comprise a first feeding track 26 (not shown), a second conveying section comprises a second distribution track 27b, an optional third conveying section comprises multiple return conveying tracks 28 (not explicitly designated), and a fourth conveying section comprises multiple second storage tracks 29a. Each second storage track 29b is respectively associated with one storage vertical conveying device 13a . . . 13c. The second storage tracks 29b are connected to the second distribution track 27b and transport the loads 5 to the respective storage vertical conveying device 13a . . . 13c.

In this example, the second distribution track 27b is again advantageously formed by a closed second circular conveying track (loop), by means of which multiple second storage tracks 29b are connected in terms of conveyance to each other. However, this is not a compulsory requirement for the invention, and an open second distribution track 27b may be provided as well.

In the example illustrated in FIG. 2, the retrieval conveying system 19 is also arranged in two conveyor planes, namely in the same conveyor planes F1, F2 in which the storage conveying system 15 is arranged as well. In the first, lower conveyor plane F1, multiple conveying sections of the first retrieval conveying devices 20a are provided, which conveying sections are successively arranged in the retrieval conveying direction of the loads 5, of which conveying sections multiple second feeding tracks 30 and a sixth conveying section comprise multiple first retrieval tracks 31a. In this example, the first distribution track 27a (second conveying section) is not only part of the first storage conveying device 16a but also part of the first retrieval conveying device 20a.

Each first retrieval track 31a is respectively associated with one retrieval vertical conveying device 17a . . . 17c (note: the first storage tracks 31a of the first, lower conveyor plane F1 are again indicated with dotted lines in FIG. 2 to better highlight their course. However, the use of dotted lines has no particular meaning beyond that).

The second feeding tracks 30 connect the order-picking station 25a . . . 25e to the first distribution track 27a and transport loads 5 to the order-picking stations 25a . . . 25e. Thus, in this example, the first distribution track 27a does not only connect the first feeding track 26 and the return conveying tracks 28 to the first storage tracks 29a, 29b but also the first retrieval tracks 31a to the second feeding tracks 30.

In the second, upper conveyor plane F2, multiple conveying sections of the second retrieval conveying device 20b, which are successively arranged in the retrieval conveying direction of the loads 5, are provided, of which conveying sections an optional fifth conveying section comprises multiple second feeding tracks 30 (not explicitly designated), and a sixth conveying section comprises multiple second retrieval tracks 31b. In this example, the second distribution track 27b (second conveying section) is not only part of the second storage conveying device 16b but also part of the second retrieval conveying device 20b. Each second retrieval track 31b is respectively associated with one retrieval vertical conveying device 17a . . . 17c. The second retrieval tracks 31b are connected via the second distribution track 27b and transport the loads 5 away from the respective retrieval vertical conveying device 17a . . . 17c.

It should be noted at this point that the third conveying section with the return conveying tracks 28 and the fifth conveying section with the feeding tracks 30 are only required if first order-picking stations 25a . . . 25e are connected to them.

As shown in FIG. 2, the one or multiple first order-picking stations 25a . . . 25e are connected to the first retrieval conveying device 20a (in particular the first distribution track 27a).

A second order-picking station 25f is indicated as well (i.e. drawn with a dashed line), which is connected to the second retrieval conveying device 20b (in particular to the second distribution track 27b). Of course, multiple second order-picking stations 25f may also be provided, which are connected to the second retrieval conveying device 20b (in particular to the second distribution track 27b), which, however, is not illustrated for better overview. Specifically, the one or multiple second order-picking stations 25f are connected to the second distribution track 27b via (not explicitly designated) return conveying track(s) 28 and feeding track(s) 30.

In FIG. 2, the first distribution track 27a is connected to the second distribution track 27b via two first connecting tracks 32a, 32b, and the second distribution track 27b is connected to the first distribution track 27a via two second connecting tracks 33a, 33b. The first distribution track 27a and the second distribution track 27b are thus mutually connected in two places. However, it should be noted that the two first connecting tracks 32a, 32b and the two second connecting tracks 33a, 33b may be provided optionally.

In the present example, the conveyor planes F1, F2 serve both for storing and retrieving and may therefore also be referred to as "(combined) storage and retrieval conveyor planes". The same applies to the distribution tracks/circular conveying tracks 27a, 27b, which serve both for storing and retrieving in the present example. Therefore, the circular conveying tracks may also be referred to as "(combined) storage and retrieval distribution tracks" or as "(combined) storage and retrieval circular conveying tracks".

The "(combined) distribution tracks/circular conveying tracks 27a, 27b" are therefore part of both the storage conveying system 16 and of the retrieval conveying system 20. Specifically, the first distribution track/circular conveying track 27a on the first conveyor plane F1 is part of the first storage conveying device 16a and of the first retrieval conveying device 20a, and the second distribution track/circular conveying track 27b on the second conveyor plane F2 is part of the second storage conveying device 16b and of the second retrieval conveying device 20b. Due to their multiple function, the distribution tracks/circular conveying tracks 27a, 27b are not designated with the reference numbers of the storage conveying system 16, the retrieval conveying system 20, the storage conveying devices 16a, 16b and the retrieval conveying devices 20a, 20b in FIG. 2. Only the first feeding track 26, the storage tracks 29a, 29b and the return conveying tracks 28 may be unambiguously associated with the storage conveying system 16, and the second feeding tracks 30 and the retrieval tracks 31a, 31b may be unambiguously associated with the retrieval conveying system 20.

Although the conveyor planes F1, F2 and the circular conveying tracks 27a, 27b serve both for storing and retrieving, a (combined) storage and retrieval conveyor plane F1, F2 may, in the scope of this disclosure, also be referred to as or considered a "storage conveyor plane" when reference is made to the storing function and be referred to as or considered a "retrieval conveyor plane" when reference is made to the retrieving function. Likewise, a (combined) storage and retrieval distribution track/circular conveying track 27a, 27b may, in the scope of this disclosure, also be referred to as or considered a "storage distribution track/ circular conveying track" when reference is made to the storing function and be referred to as or considered a "retrieval distribution track/circular conveying track" when reference is made to the retrieving function.

As mentioned above, conveying sections leading away from a combined storage/retrieval circular conveying track 27a, 27b may continue to exclusively serve for storing loads 5 (for example the storage tracks 29a, 29b of the storage conveying system 15), and conveying sections leading to the combined storage/retrieval circular conveying track 27a, 27b may continue to exclusively serve for retrieving loads 5 (for example the retrieval tracks 31a, 31b of the retrieval conveying system 19).

Furthermore, it should be noted that the joint use of the circular conveying tracks 27a, 27b for the storage conveying system 16 and the retrieval conveying system 20 is not a compulsory requirement for the order-picking system 24a illustrated in FIG. 2. Rather, it is also conceivable that the storage conveying system 16 and the retrieval conveying system 20 are arranged separately from one another. For example, the first storage conveying device 16a may be arranged on a first conveyor plane F1, the second storage conveying device 16b on a second conveyor plane F2, the first retrieval conveying device 20a on a third conveyor plane, and the second retrieval conveying device 20b on a fourth conveyor plane. A mixed construction is conceivable as well. In this case, some of the circular conveying tracks 27a, 27b are only used for storage, some of the circular conveying tracks 27a, 27b are only used for retrieval, and some of the circular conveying tracks 27a, 27b are mixedly used for storage and retrieval.

In general, the storage of loads 5 comprises storing loads 5 from the incoming goods department (new goods or returned goods) and re-storing loads 5 from the order-picking stations 25a . . . 25f. The retrieval of loads 5 comprises transporting the loads 5 to the order-picking stations 25a . . . 25f.

As mentioned, the distribution tracks 27a, 27b do not necessarily have to be configured as closed circular conveying tracks (loops), although this is advantageous. Instead, the first distribution track 27a and/or the second distribution track 27b may also be configured as (an) open conveying section(s).

The first feeding track 26, the two distribution tracks/circular conveying tracks 27a, 27b, the return conveying tracks 28, the second feeding tracks 30, the first connecting tracks 32a, 32b, the second connecting tracks 33a, 33b as well as the storage tracks 29a, 29b and the retrieval tracks 31a, 31b comprise driven conveying devices, such as belt conveyors, roller conveyors, chain conveyors, and the like. In particular, a mixed construction is conceivable as well.

Transfer of the loads 5 from the first feeding track 26 onto the first distribution track 27a, from the return conveying tracks 28 onto the first distribution track 27a, from the first distribution track 27a onto the first storage tracks 29a, from the second distribution track 27b onto the second storage tracks 29b, from the first retrieval tracks onto the first distribution track 27a, from the second retrieval tracks onto the second distribution track 27b, and from the first distribution track 27a onto the second feeding tracks 30 may be enabled by means of infeed and outfeed devices. The infeed and outfeed devices may, for example, comprise strap offsets, skate wheel transfers, and the like.

The conveyor connection between the first storage conveying device 16a and the second storage conveying device 16b and between the first retrieval conveying device 20a and the second retrieval conveying device 20b (i.e. the connecting tracks 32a, 32b, 33a, 33b between the first distribution track 27a and the second distribution track 27b in the example shown) may each comprise driven conveying devices, such as a belt conveyor, a roller conveyor, an outfeed conveyor, an infeed conveyor, and the like, or a driven vertical conveying device each. Belt conveyors are particularly suitable for compensating the height between the first storage conveying device 16a and the second storage conveying device 16b and between the first retrieval conveying device 20a and the second retrieval conveying device 20b (or between the first distribution track 27a and the second distribution track 27b). Basically, said conveyor connection may also comprise one single conveying device, which is formed, for example, by a driven vertical conveying device, in particular by a spiral conveyor, a vertical lift, and the like. This single conveying device may nevertheless serve as a mutual conveyor connection between the storage conveying devices 16a, 16b, the retrieval conveying devices 20a, 20b or between the distribution tracks 27a, 27b if it is operable in two directions, i.e. if it is capable of conveying from bottom to top and from top to bottom.

Via the connecting tracks 32a, 32b, 33a, 33b, some of the loads 5 may, while they are delivered or transported away, be transferred from the first distribution track 27a onto the second distribution track 27b, and some of the loads 5 from the second distribution track 27b onto the first distribution track 27a.

In the embodiment illustrated in FIG. 2, the conveyor connection between a first storage conveying device 16a and a second storage conveying device 16b is arranged in the area of the second conveying section and therefore in the area of the first distribution track 27a and the second distribution track 27b. The first storage conveying device 16a and the second storage conveying device 16b are connected in terms of conveyance to the first connecting tracks 32a, 32b and the second connecting tracks 33a, 33b. This embodiment has a particularly favorable effect if multiple storage vertical conveying devices 13a . . . 13c are provided (as is the case in FIG. 2), as then one single conveyor connection between multiple first storage tracks 29a and multiple second storage tracks 29b is sufficient in principle. Thus, the structure of the storage conveying system 15 is simplified.

However, an embodiment is also possible according to which the conveyor connection between a first storage conveying device 16a and a second storage conveying device 16b is arranged in the area of the fourth conveying section, i.e. directly in the area of a first storage track 29a and an associated second storage track 29b (see also FIGS. 4 to 7). This embodiment is used, for example, when only few or even only one single storage vertical conveying device 13a . . . 13c is provided. However, this does not exclude conveyor connections 32a, 32b, 33a, 33b from being provided in the area of the first distribution track 27a and the second distribution track 27b as well.

In the embodiment illustrated in FIG. 2, the conveyor connection between a first retrieval conveying device 20a and a second retrieval conveying device 20b is also arranged in the area of the second conveying section, here in the area of the first distribution track 27a and the second distribution track 27b, namely with the first connecting tracks 32a, 32b and the second connecting tracks 33a, 33b. This embodiment has a particularly favorable effect if multiple retrieval vertical conveying devices 17a . . . 17c are provided, as then one single conveyor connection between multiple first retrieval tracks 31a and multiple second retrieval tracks 31b is sufficient in principle. Thus, the structure of the retrieval conveying system 19 is simplified.

However, an embodiment is also possible according to which the conveyor connection between a first retrieval conveying device 20a and a second retrieval conveying device 20b is arranged in the area of the sixth conveying section, i.e. directly in the area of a first retrieval track 31a and an associated second retrieval track 31b (see also FIGS. 4 to 7). This embodiment is used, for example, when only few or even only one single retrieval vertical conveying device 17a . . . 17c is provided. However, this does not exclude conveyor connections 32a, 32b, 33a, 33b from being provided in the area of the first distribution track 27a and the second distribution track 27b as well.

It should also be noted at this point that the second conveyor plane F2 may have the same structure as the first conveyor plane F1 and may also comprise multiple order-picking stations 25f as well as a first feeding track 26. Of course, it is also conceivable that the order-picking stations 25f and the first feeding track 26 are only arranged in the second conveyor plane F2. Moreover, the first feeding track 26 may be arranged in a different conveyor plane F1, F2 than the order-picking stations 25a . . . 25f.

Figure 3:
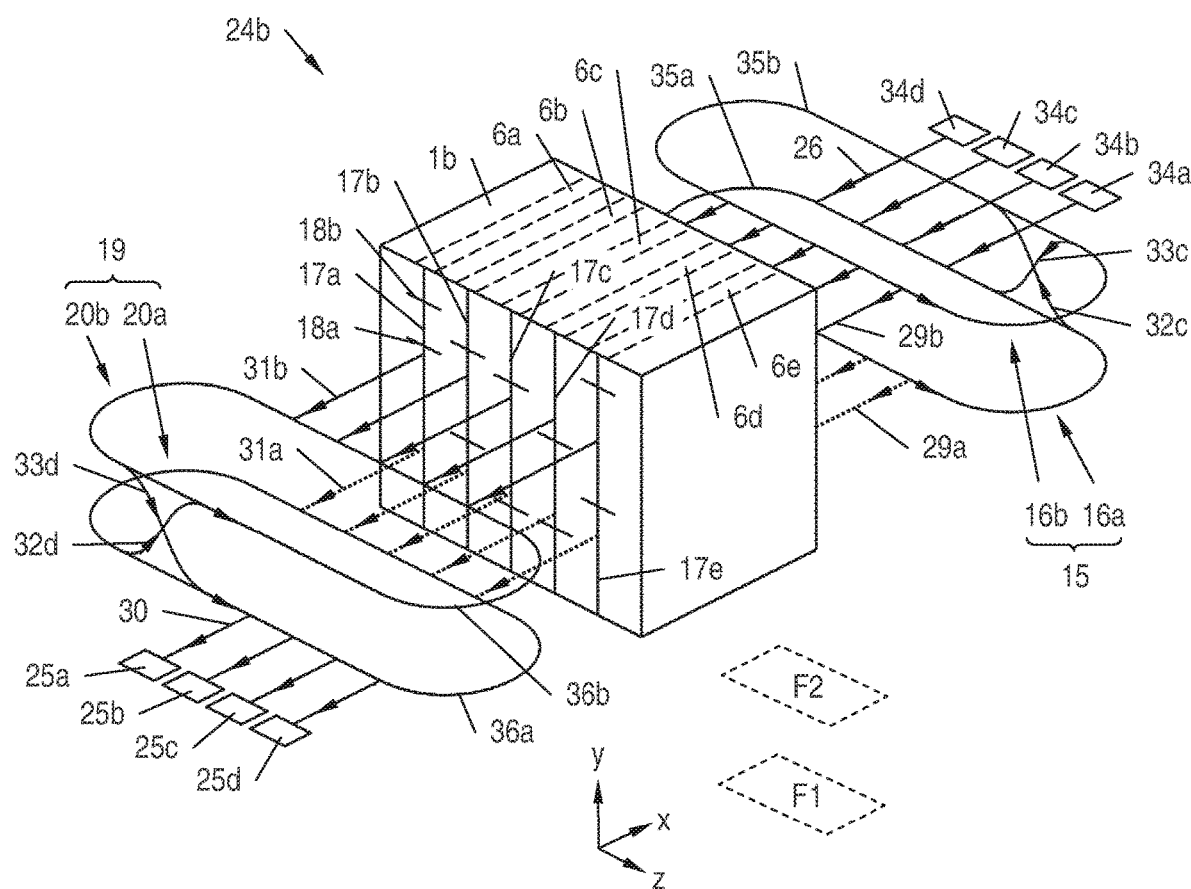
FIG. 3 oblique view of a second exemplary embodiment of an order-picking system, where the storage and retrieval conveying system is arranged in different rack aisle sections of a rack aisle.

FIG. 3 now shows an exemplary order-picking system 24b, which is very similar to the order-picking system 24a disclosed in FIG. 2. In contrast, however, storage is carried out at a first rack aisle end, and retrieval at a second rack aisle end. Specifically, the order-picking system 24b comprises a storage arrangement 1b, where one or multiple storage vertical conveying devices 13 are arranged in a first rack aisle section of the rack aisles 6a . . . 6e (for example at a first rack aisle end in FIG. 3 and therefore not visible in FIG. 3), and one or multiple retrieval vertical conveying devices 17a . . . 17e in a second rack aisle section of the rack aisle 6a . . . 6e (for example at a second rack aisle end in FIG. 3 and merely symbolically illustrated in FIG. 3). In general, the first rack aisle section and the second rack aisle section may be provided in the course of the rack aisle 6a . . . 6e (e.g. centrally) or at the front end at the rack aisle ends of the rack aisle 6a . . . 6e and separately from one another. To give a better overview, only the retrieval transport platforms 18a, 18b of the first retrieval vertical conveying device 17a are explicitly designated. Of course, however, the storage vertical conveying devices 13 also each have two storage transport platforms 14a, 14b, and the retrieval vertical conveying devices 17b, 17c each have two retrieval transport platforms 18a, 18b. The order-picking system 24b may comprise multiple goods-in stations 34a . . . 34d, which are connected in terms of conveyance to the storage arrangement 1b, as well as multiple order-picking stations 25a . . . 25d, which are connected in terms of conveyance to the storage arrangement 1b, as is the case in FIG. 3.

In the example illustrated in FIG. 3, the storage conveying system 15 is again arranged in two conveyor planes F1, F2. In a first, lower conveyor plane F1, multiple conveying sections of the first storage conveying device 16a are provided, which are successively arranged in the storage conveying direction of the loads 5, of which conveying sections a first conveying section comprises multiple first feeding tracks 26, a second conveying section comprises a first storage distribution track 35a, and a third conveying section comprises multiple first storage tracks 29a. The third conveying section of the order-picking system 24b illustrated in FIG. 3 thus corresponds to the fourth conveying section of the order-picking system 24a illustrated in FIG. 2. Each first storage track 29a is respectively associated with one storage vertical conveying device 13 (note: the first storage tracks 29a of the first, lower conveyor plane F1 are again indicated with dotted lines in FIG. 3. However, the use of dotted lines has no particular meaning beyond that). The first feeding tracks 26 are connected to the first storage distribution track 35a and transport the loads 5 away from the goods-in stations 34a . . . 34d. The first storage tracks 29a are connected to the first storage distribution track 35a and deliver the loads 5 to the respective storage vertical conveying device 13. In this example, the first storage distribution track 35a is advantageously formed by a closed first circular conveying track (loop), by which the first feeding tracks 26 and multiple first storage tracks 29a are connected in terms of conveyance to each other.

In a second, upper conveyor plane F2, multiple storage conveying sections of the second storage conveying device 16b are provided, which are successively arranged in the storage conveying direction of the loads 5, specifically a second storage distribution track 35b and multiple second storage tracks 29b. Each second storage track 29b is respectively associated with one storage vertical conveying device 13. The second storage tracks 29b are connected to the second storage distribution track 35b and deliver the loads 5 to the respective storage vertical conveying device 13. In this example, the second storage distribution track 35b is again advantageously formed by a closed second circular conveying track (loop), by means of which multiple second storage tracks 29b are connected in terms of conveyance to each other.

In FIG. 3, the first storage distribution track 35a is connected to the second storage distribution track 35b via a first connecting track 32c, and the second storage distribution track 35a is connected to the first storage distribution track 35a via a second connecting track 33c. This means that the first storage distribution track 35a and the second storage distribution track 35b are mutually connected.

In the example illustrated in FIG. 3, the retrieval conveying system 19 is also arranged in two conveyor planes, namely in the same conveyor planes F1, F2 in which the storage conveying system 15 is arranged as well. In the first, lower conveyor plane F1, multiple conveying sections of the first retrieval conveying device 20a are provided, which are successively arranged in the retrieval conveying direction of the loads 5, of which conveying sections a first conveying section comprises multiple first retrieval tracks 31a, a second conveying section comprises a first retrieval distribution track 36a, and a third conveying section comprises multiple second feeding tracks 30. Each first retrieval track 31a is respectively associated with one retrieval vertical conveying device 17a . . . 17e (note: the first retrieval tracks 31a of the first, lower conveyor plane F1 are again indicated with dotted lines in FIG. 3 to better highlight their course. However, the use of dotted lines has no particular meaning beyond that). In this example, the first retrieval distribution track 36a connects the first retrieval tracks 31a to the second feeding tracks 30, via which loads 5 are transported to the order-picking stations 25a . . . 25d.

In the second, upper conveyor plane F2, multiple conveying sections of the second retrieval conveying device 20b are also provided, which are successively arranged in the retrieval conveying direction of the loads 5, specifically a second retrieval distribution track 36b and multiple second retrieval tracks 31b. Each second retrieval track 31b is respectively associated with one retrieval vertical conveying device 17a . . . 17e. The second retrieval tracks 31b are connected via the second retrieval distribution track 36b and transport the loads 5 away from the respective retrieval vertical conveying device 17a . . . 17e.

In FIG. 3, the first retrieval distribution track 36a is connected to the second retrieval distribution track 36b via a first connecting track 32d, and the second retrieval distribution track 36b is connected to the first retrieval distribution track 36a via a second connecting track 33d. The first retrieval distribution track 36a and the second retrieval distribution track 36b are thus also mutually connected.

The storage of loads 5 comprises storing loads 5 from the goods-in stations 34a . . . 34d (new goods or returned goods) and may also comprise re-storage of loads 5 from the order-picking stations 25a . . . 25d. In FIG. 3, no return conveying tracks 28 are illustrated; they may, however, be provided in the order-picking system 24b (see also FIG. 2). Via a connecting line, which is not shown either, from a retrieval distribution track 36a, 36b to a storage distribution track 35a, 35b or multiple of such connecting lines, loads 5 (which are not required for an order) may be transported from the retrieval side to the storage side. The retrieval of loads 5 again comprises transporting the loads 5 to the order-picking stations 25a . . . 25d.

It shall also be noted at this point that the storage distribution tracks 35a, 35b and the retrieval distribution tracks 36a, 36b do not necessarily have to be configured as closed circular conveying tracks (loops), although this is advantageous. Instead, the first storage distribution track 35a and/or the second storage distribution track 35b and/or the first retrieval distribution track 36a and/or the second retrieval distribution track 36b may also be configured as (an) open conveying section(s).

The first feeding tracks 26, the two storage distribution tracks/circular conveying tracks 35a, 35b, the two retrieval distribution tracks/circular conveying tracks 36a, 36b, the second feeding tracks 30, the first connecting tracks 32c, 32d, the second connecting tracks 33c, 33d as well as the storage tracks 29a, 29b and the retrieval tracks 31a, 31b comprise driven conveying devices, such as belt conveyors, roller conveyors, chain conveyors, and the like. In particular, a mixed construction is conceivable as well.

Transfer of the loads 5 from the first feeding tracks 26 onto the first storage distribution track/circular conveying track 35a, from the first storage distribution track/circular conveying track 35a onto the first storage tracks 29a, from the second storage distribution track/circular conveying track 35b onto the second storage tracks 29b, from the first retrieval tracks 31a onto the first retrieval distribution track/circular conveying track 36a, from the second retrieval tracks 31b onto the second retrieval distribution track/circular conveying track 36b and from the first retrieval distribution track/circular conveying track 36a onto the second feeding tracks 30 may be enabled by means of infeed and outfeed devices. The infeed and outfeed devices may, for example, comprise strap offsets, skate wheel transfers, and the like.

The conveyor connection between the first storage conveying device 16a and the second storage conveying device 16b (i.e. the connecting tracks 32c, 33c between the first storage distribution track 35a and the second distribution track 35b in the example shown) and between the first retrieval conveying device 20a and the second retrieval conveying device 20b (i.e. the connecting tracks 32d, 33d between the first retrieval distribution track 36a and the second retrieval distribution track 36b in the example shown) may each again comprise driven conveying devices, such as a belt conveyor, a roller conveyor, an outfeed conveyor, an infeed conveyor, and the like, or a driven vertical conveying device each. Belt conveyors are particularly suitable for compensating the height between the first storage conveying device 16a and the second storage conveying device 16b or between the first storage distribution track 35a and the second storage distribution track 35b. Moreover, belt conveyors are particularly suitable for compensating the height between the first retrieval conveying device 20a and the second retrieval conveying device 20b or between the first retrieval distribution track 36a and the second retrieval distribution track 36b. Basically, said conveyor connections may also comprise simple conveying devices, which are formed, for example, by a driven vertical conveying device, in particular by a spiral conveyor, a vertical lift, and the like. Such a conveyor connection may nevertheless serve as a mutual conveyor connection between the storage conveying devices 16a, 16b or between the storage distribution track 35a, 35b or as a mutual conveyor connection between the retrieval conveying devices 20a, 20b or between the retrieval distribution tracks 36a, 36b if it is operable in two directions, i.e. if it is capable of conveying from bottom to top and from top to bottom.

Via the connecting tracks 32c, 33c, some of the loads 5 may, while they are delivered, be transferred from the first storage distribution track 35a onto the second storage distribution track 35b, and some of the loads 5 from the second storage distribution track 35b onto the first storage distribution track 35a. In addition, via the connecting tracks 32d, 33d, some of the loads 5 may, while they are transported away, be transferred from the first retrieval distribution track 36a onto the second retrieval distribution track 36b, and some of the loads 5 from the second retrieval distribution track 36a onto the first retrieval distribution track 36a.

The function of the storage arrangements 1, 1a, 1b and the order-picking systems 24a, 24b will be explained below with reference to FIGS. 4 to 7, each of which show a schematic side view of a storage arrangement 1c in different system states.

Specifically, FIGS. 4 to 7 each show a storage arrangement 1c comprising a rack arrangement 2 with an input side (on the right) and an output side (on the left).

On the input side, the storage arrangement 1c comprises a storage vertical conveying device 13 having two vertically movable storage transport platforms 14a, 14b, and two storage conveying devices 16a, 16b upstream of the storage vertical conveying device 13. The storage conveying devices 16a, 16b may be mutually connected via a first connecting track 32c and a second connecting track 33c if necessary, as is the case in FIG. 4. In addition, the storage movement area E1 of the first storage transport platforms 14a and the storage movement area E2 of the second storage transport platforms 14b are also illustrated in FIG. 4.

On the output side, the storage arrangement 1c comprises a retrieval vertical conveying device 17 having two vertically movable retrieval transport platforms 18a, 18b, and two retrieval conveying devices 20a, 20b downstream of the retrieval vertical conveying device 17. The retrieval conveying devices 20a, 20b are mutually connected via a first connecting track 32d and a second connecting track 33d. In addition, the retrieval movement area A1 of the first retrieval transport platform 18a and the retrieval movement area A2 of the second retrieval transport platform 18b are also illustrated in FIG. 4.

Figure 4:
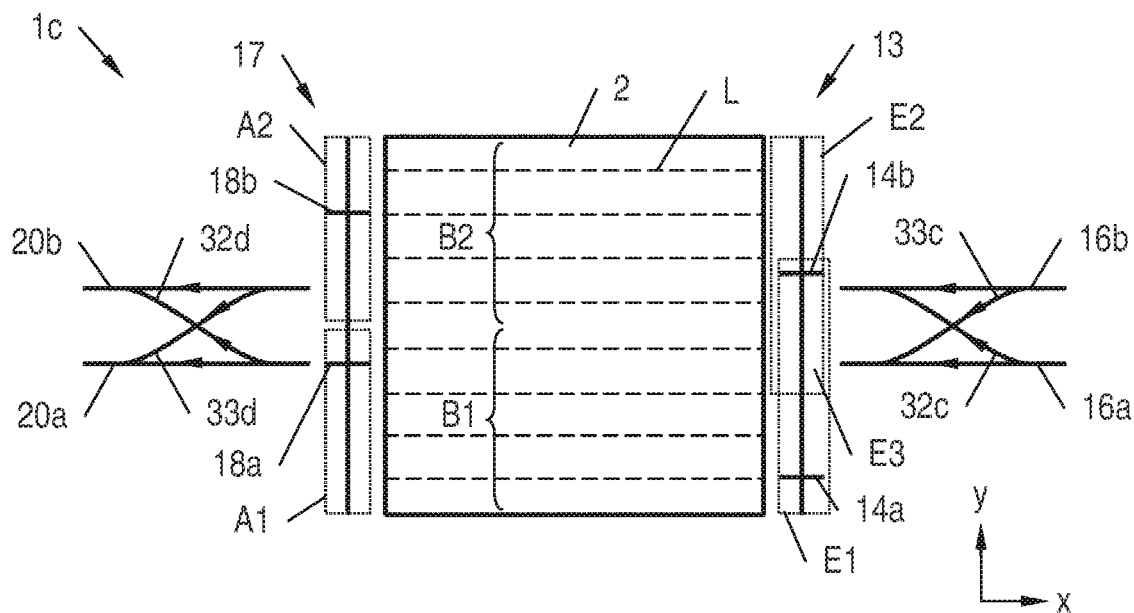
FIG. 4 side view of a schematic representation of a storage arrangement in a first operating mode with overlapping storage movement areas and separate retrieval movement areas.

As regards its structure and range of functions, the storage arrangement 1c illustrated in FIG. 4 is similar to the storage arrangement 1b illustrated in FIG. 3. In this regard, the first connecting track 32c and the second connecting track 33c illustrated in FIG. 4 may be arranged between the storage distribution tracks/circular conveying tracks 35a, 35b (as is the case in FIG. 3) and/or directly between the storage tracks 29a, 29b. A change of a load 5 from the first storage conveying device 16a onto the second storage conveying device 16b and vice versa is possible in both cases.

The same applies to the output side. The first connecting track 32d and the second connecting track 33d illustrated in FIG. 4 may be arranged between the retrieval distribution tracks/circular conveying tracks 36a, 36b (as is the case in FIG. 3) and/or directly between the retrieval tracks 31a, 31b. A change of a load 5 from the first retrieval conveying device 20a onto the second retrieval conveying device 20b and vice versa is possible in both cases.

Although the storage arrangement 1c illustrated in FIG. 4 is structurally more similar to the storage arrangement 1b illustrated in FIG. 3, the range of functions of the storage arrangement 1c illustrated in FIG. 4 and the storage arrangement 1a illustrated in FIG. 2 are nevertheless well comparable. For this purpose, one would have to imagine to fold the input side from the right to the left side.

In particular, the one/multiple storage vertical conveying device(s) 13, 13a . . . 13c and the one/multiple retrieval vertical conveying device(s) 17, 17a . . . 17e are arranged in a rack aisle section along the rack aisle(s) 6, 6a . . . 6e or at one of the rack aisle ends of the rack aisle(s) 6, 6a . . . 6e.

The storage conveying system 15 may either comprise the first storage conveying device 16a and the second storage conveying device 16b or only the first storage conveying device 16a.

It should once again also be noted that the conveyor connection between the first storage conveying device 16a and the second storage conveying device 16b is optional.

The retrieval conveying system 19 may either comprise the first retrieval conveying device 20a and the second retrieval conveying device 20b or only the first retrieval conveying device 20a.

It should also be noted that the mutual connection of the two retrieval conveying devices 20a, 20b by means of the first connecting track 32d and the second connecting track 33d is not compulsory. Advantageously, loads 5 retrieved on the first retrieval conveying device 20a may thereby be transferred onto the second retrieval conveying device 20b, and loads 5 retrieved on the second retrieval conveying device 20b onto the first retrieval conveying device 20a, which increases flexibility during the retrieval process; however, the first connecting track 32d or the second connecting track 32d may also be left out. Basically, a simple joining of the retrieval distribution tracks 36a, 36b is on hand then, or thus also a simple joining of the retrieval conveying devices 20a, 20b. It is also possible to leave out both of the connecting tracks 32d, 33d.

Below, the functioning of the storage arrangements 1a . . . 1c illustrated in FIGS. 2 to 7 will be jointly described.

Loads 5 are delivered for the storage process, for example coming from a goods-in station 34a . . . 34d or a first feeding track 26, or from an order-picking station 25a . . . 25f or a return conveying track 28. In this regard, the path via a distribution track/circular conveying track (loop) 27a, 27b, 35a, 35b, 36a, 36b is possible but not compulsory.

The control system 21 controls the storage transport platforms 14a, 14b such that loads 5 to be stored are taken over from the storage conveying system 15 and released onto the storage buffer device 7. The storage and retrieval device 11 takes over the loads 5 from the storage buffer device 7 and subsequently places them on a selected storage place 4. In this process, the first storage transport platform 14a moves within a first storage movement area E1, and the second storage transport platform 14b within a second storage movement area E2.

For the retrieval process, the storage and retrieval device 11 collects the loads 5 from the storage place 4 and transfers them to the retrieval buffer device 9. The control system 21 controls the retrieval transport platforms 18a, 18b such that loads 5 to be retrieved are taken over from the retrieval buffer device 9 and released onto the retrieval conveying system 19. In this process, the first retrieval transport platform 18a moves within a first retrieval movement area A1, and the second retrieval transport platform 18b within a second retrieval movement area A2.

The loads 5 are subsequently transported away, for example via a second feeding track 30 to one of the order-picking stations 25a . . . 25f. In this regard, the path via a distribution track/circular conveying track (loop) 27a, 27b, 35a, 35b, 36a, 36b is again possible but not compulsory.

Hence, the storage conveying system 15 delivers loads 5 to be stored and advantageously releases them to the storage vertical conveying device 13, 13a . . . 13c only. Advantageously, loads 5 to be retrieved are released onto the retrieval conveying system 19 by the retrieval vertical conveying device 17 only and transported away by the retrieval conveying system 19. This way, the storage process and the retrieval process may be carried out completely decoupled from one another.

Basically, multiple options are conceivable for operating the storage arrangement 1a . . . 1c. For example, it is conceivable that the storage transport platforms 14a, 14b are strictly associated with the storage conveying devices 16a, 16b. This means that the first storage conveying device 16a is associated with the first storage transport platform 14a and (only) accessible by the first storage transport platform 14a for storing a load 5. Accordingly, the second storage conveying device 16b is associated with the second storage transport platform 14b and (only) accessible by the second storage transport platform 14b for storing a load 5.

However, it also conceivable that the storage transport platforms 14a, 14b are flexibly associated with the storage conveying devices 16a, 16b. In this case, the first storage conveying device 16a may either be associated with the first storage transport platform 14a or with the second storage transport platform 14b and accessed by the first or the second storage transport platform 14a, 14b for storing a load 5. Accordingly, the second storage conveying device 16b may also either be associated with the first storage transport platform 14a or with the second storage transport platform 14b and accessed by the first or the second storage transport platform 14a, 14b for storing a load 5.

It should also be noted that the mutual connection of the two storage conveying devices 16a, 16b by means of the first connecting track 32c and the second connecting track 33c is not compulsory. Advantageously, loads 5 delivered on the first storage conveying device 16a may thereby be transferred onto the second storage conveying device 16b, and loads 5 delivered on the second storage conveying device 16b onto the first storage conveying device 16a, which increases flexibility during the storage process; however, the first connecting track 32c or the second connecting track 32d may also be left out. Basically, a simple joining of the storage distribution tracks 35a, 35b is on hand then, and thus also a simple joining of the storage conveying devices 16a, 16b. It is also possible to leave out both of the connecting tracks 32c, 33c.

Finally, it is also conceivable that the storage arrangement 1a . . . 1c comprises only the first storage conveying device 16a (but no second storage conveying device 16b), wherein the first storage conveying device 16a may be associated with the first storage transport platform 14a and the second storage transport platform 14b and be accessed by the first storage transport platform 14a and the second storage transport platform 14b for storing a load 5.

Basically, the above options are equivalently also conceivable during the retrieval process. Therefore, it is also conceivable, for example, that the retrieval transport platforms 18a, 18b are strictly associated with the retrieval conveying devices 20a, 20b. This means that the first retrieval conveying device 20a is associated with the first retrieval transport platform 18a and (only) accessible by the first retrieval transport platform 18a for retrieving a load 5. Accordingly, the second retrieval conveying device 20b is associated with the second retrieval transport platform 18b and (only) accessible by the second retrieval transport platform 18b for retrieving a load 5.

However, it is also conceivable that the retrieval transport platforms 18a, 18b are flexibly associated with the retrieval conveying devices 20a, 20b. In this case, the first retrieval conveying device 20a may either be associated with the first retrieval transport platform 18a or with the second retrieval transport platform 18b and be accessed by the first or the second retrieval transport platform 18a, 18b for retrieving a load 5. Accordingly, the second retrieval conveying device 20b may also either be associated with the first retrieval transport platform 18a or with the second retrieval transport platform 18b and be accessed by the first or the second retrieval transport platform 18a, 18b for retrieving a load 5.

If the storage arrangement 1a . . . 1c only comprises the first retrieval conveying device 20a (but no second retrieval conveying device 20b), the first retrieval conveying device 20a is associated with the first retrieval transport platform 18a and the second retrieval transport platform 18b, and the first retrieval conveying device 20a may be accessed by the first retrieval transport platform 18a and by the second retrieval transport platform 18b for retrieving a load 5.

In another embodiment, a first storage parameter for a first storage zone B1 of the rack arrangement 2 and a second storage parameter for a second storage zone B2 of the rack arrangement 2 are used for determining how the storage process is carried out. Specifically, an evaluation unit (which may, for example, be arranged in the control system 21 or be part thereof) determines and compares the first storage parameter and the second storage parameter.

The first storage parameter is defined by the ratio between available storage places 4 and occupied storage places 4 in the first storage zone B1, and the second storage parameter is defined by the ratio between available storage places 4 and occupied storage places 4 in the second storage zone B2. The loads 5 are subsequently stored into the rack arrangement 2 advantageously in respect of mutually adapting storage parameters in the first storage zone B1 and in the second storage zone B2.

The first storage zone B1 has a different vertical extension than the second storage zone B2. In the example illustrated in FIG. 4, the first storage zone B1 and the second storage zone B2 are arranged vertically above one another and do not have an overlapping area. However, it would also be conceivable that the first storage zone B1 and the second storage zone B2 overlap. It is further conceivable that the above-mentioned embodiment is based on more than two storage zones B1, B2.

By the measures suggested, unbalanced utilization of the storage places 4 in the first storage zone B1 and in the second storage zone B2 and a resulting unbalanced load may be prevented, and balanced utilization of the retrieval provisioning devices 10, the storage and retrieval devices 11, the retrieval transport platforms 18a, 18b and the retrieval conveying devices 20a, 20b during retrieval of loads 5 may be achieved.

A difference between the first storage parameter and the second storage parameter may be determined, for example, by calculating the difference or by calculating a quotient between the first storage parameter and the second storage parameter.

The storage zones B1, B2 are defined by a "logical" separation. For example, the first storage zone B1 beneath the "logical" separation comprises a number of storage planes L, and the second storage zone B2 above the "logical" separation comprises a number of different storage planes L. The number of storage places 4 in the first storage zone B1 and in the second storage zone B2 may in particular be identical. In this case, the quotient between the first storage parameter and the second storage parameter corresponds to the quotient between the number of loads 5 stored in the first storage zone B1 and the number of loads 5 stored in the second storage zone B2.

The storage zones B1, B2 may each comprise one single storage plane L or a plurality of storage planes L. In particular, the vertical extension of the storage zones B1, B2 may correspond to the vertical extension of the storage movement areas E1, E2 and/or the retrieval movement areas A1, A2. With regard to the example given, this means that the vertical extension of the first storage zone B1 may correspond to the vertical extension of the first storage movement area E1 and/or the first retrieval movement area A1, and the vertical extension of the second storage zone B2 may correspond to the vertical extension of the second storage movement area E2 and/or the second retrieval movement area A2.

Advantageously, the loads 5 may be randomly stored into the storage arrangement 1a . . . 1c within the first storage zone B1 and/or within the second storage zone B2. This way, the control effort for storing the loads 5 may be kept small.

Moreover, the allocation of the storage zones B1, B2 may be static or dynamic (i.e. the storage zones B1, B2 may change their sizes and/or positions over time).

In another variation of the method presented, the loads 5 to be stored into the storage arrangement 1c are randomly and/or evenly distributed to the first storage conveying device 16a and the second storage conveying device 16b of the storage conveying system 15. This is a possibility to keep the control effort for conveying the loads 5 small.

In particular, it is advantageous if the first storage movement area E1 and the second storage movement area E2 overlap and the first retrieval movement area A1 and the second retrieval movement area A2 are separate from one another, as illustrated in FIG. 4. The storage movement areas E1 and E2 thus have a storage overlapping area E3, which may be accessed both by the first storage transport platform 14a and by the second storage transport platform 14b. The control system 21 prevents collisions between the two storage transport platforms 14a, 14b.

In this embodiment, one takes advantage of the fact that during storage of a load 5, the storage place 4 may usually be freely chosen. This applies in particular if the loads 5 are stored in a storage arrangement 1a . . . 1c in an unordered manner. This is accounted for by the fact that the storage movement areas E1, E2 overlap and have a storage overlapping area E3. One storage transport platform 14a, 14b may thus cover a comparatively large area of storage planes L.

As opposed to storage, during retrieval, a particular storage place 4 is accessed on which the required load 5 is stored. In addition, the retrieval process is usually more time-critical than the storage process as the time between the order of a load 5 and the delivery must be short. This is accounted for by the fact that the retrieval movement areas A1, A2 are separate from one another and do not have an overlapping area. The retrieval transport platforms 18a, 18b may therefore be moved without influencing one another and at high speed within the associated retrieval movement areas A1, A2.

However, it is also conceivable that different operating modes are provided, which are indicated in FIGS. 4 to 7.

Basically, the first operating mode was already explained above. The control system 21 controls the first storage transport platform 14a and the second storage transport platform 14b in the first operating mode such that the storage movement areas E1, E2 of the first storage transport platform 14a and the second storage transport platform 14b vertically overlap during storage of loads 5. In addition, in the first operating mode, the control system 21 controls the first retrieval transport platform 18a and the second retrieval transport platform 18b such that the retrieval movement areas A1, A2 of the first retrieval transport platform 18a and the second retrieval transport platform 18b are always vertically separate from one another during retrieval of loads 5.

Figure 5:
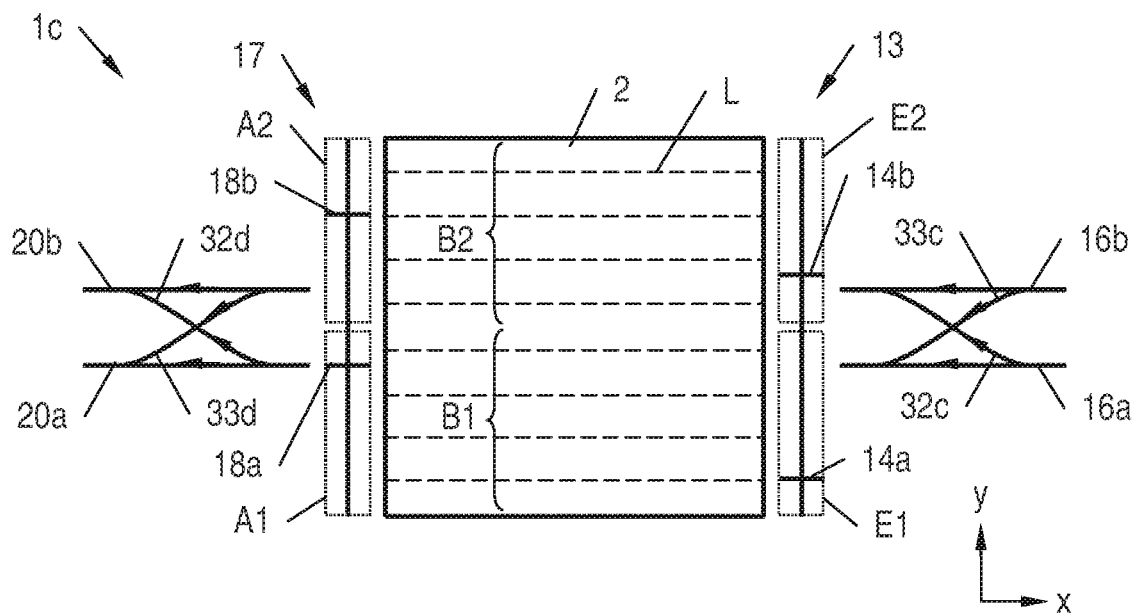
FIG. 5 the storage arrangement from FIG. 4 in a second operating mode with separate storage movement areas and separate retrieval movement areas.

In a second operating mode, which is indicated in FIG. 5, the storage movement areas E1, E2 of the first storage transport platforms 14a and the second storage transport platforms 14b are vertically separate from one another during storage of loads 5. Likewise, the retrieval movement areas A1, A2 of the first retrieval transport platform 18a and the second retrieval transport platform 18b are vertically separate from one another in the second operating mode during retrieval of loads 5.

Switching between the first and the second operating modes may be carried out by the control system 21, in particular based on a storage parameter for the storage zones B1, B2 of the storage arrangement 1c. As already mentioned above, an evaluation unit may determine and compare a first storage parameter for the first storage zone B1 of the storage arrangement 1c and a second storage parameter for the second storage zone B2 of the storage arrangement 1c. The first storage parameter is defined by the ratio between available storage places 4 and occupied storage places 4 in the first storage zone B1, and the second storage parameter is defined by the ratio between available storage places 4 and occupied storage places 4 in the second storage zone B2. In this regard, the first storage zone B1 has a different vertical extension than the second storage zone B2.

The control system 21 then operates the first storage transport platform 14a and the second storage transport platform 14b in the first operating mode if a difference between the first storage parameter and the second storage parameter lies above a first threshold, i.e. if the storage zones B1, B2 are unbalanced with regard to their occupancy.

By contrast, the control system 21 then operates the first storage transport platform 14a and the second storage transport platform 14b in the second operating mode if a difference between the first storage parameter and the second storage parameter lies below the first threshold or below a second threshold, which lies below the first threshold. This means that the second operating mode is provided if the occupancy of the storage zones B1, B2 is (substantially) balanced. Advantageously, the variation is used where switching into the second operating mode is carried out if a difference between the first storage parameter and the second storage parameter lies below a second threshold, which lies below the first threshold. The hysteresis provided in this case prevents too frequent switching between the first and the second operating modes. Basically, however, the variation may also be used where switching into the second operating mode is carried out if a difference between the first storage parameter and the second storage parameter lies below the first threshold, i.e. no hysteresis is provided.

The retrieval movement areas A1, A2 of the retrieval transport platforms 18a, 18b are vertically separate from one another both in the first operating mode and in the second operating mode and thus irrespectively of a storage parameter.

The control system 21 operates the first retrieval transport platform 18a and the second retrieval transport platform 18b in the first operating mode or in the second operating modes especially if operating ability of the first retrieval transport platform 18a and the second retrieval transport platform 18b and of the first retrieval conveying device 20a and the second retrieval conveying device 20b is determined by a diagnostic unit (which may be part of the control system 21) or if the operating ability is not impaired.

However, it is also conceivable that the control system 21 operates the first retrieval transport platform 18a and the second retrieval transport platform 18b in a third operating mode or in a fourth operating mode if an impairment of the operating ability of the first retrieval transport platform 18a or the second retrieval transport platform 18b or of the first retrieval conveying device 20a or the second retrieval conveying device 20b is determined by the diagnostic unit, or if operating ability is no longer present.

Both in the third operating mode and in the fourth operating mode, the retrieval movement areas A1, A2 of the first retrieval transport platform 18a and the second retrieval transport platform 18b vertically overlap during retrieval of loads 5. Consequently, there is a retrieval overlapping area A3. The control system 21 again prevents collisions between the two retrieval transport platforms 18a, 18b.

Furthermore, the storage movement areas E1, E2 of the first storage transport platform 14a and the second storage transport platform 14b vertically overlap in the third operating mode during storage of loads 5. However, in the fourth operating mode, the storage movement areas E1, E2 of the first storage transport platform 14a and the second storage transport platform 14b are vertically separate from one another during storage of loads 5.

Figure 6:
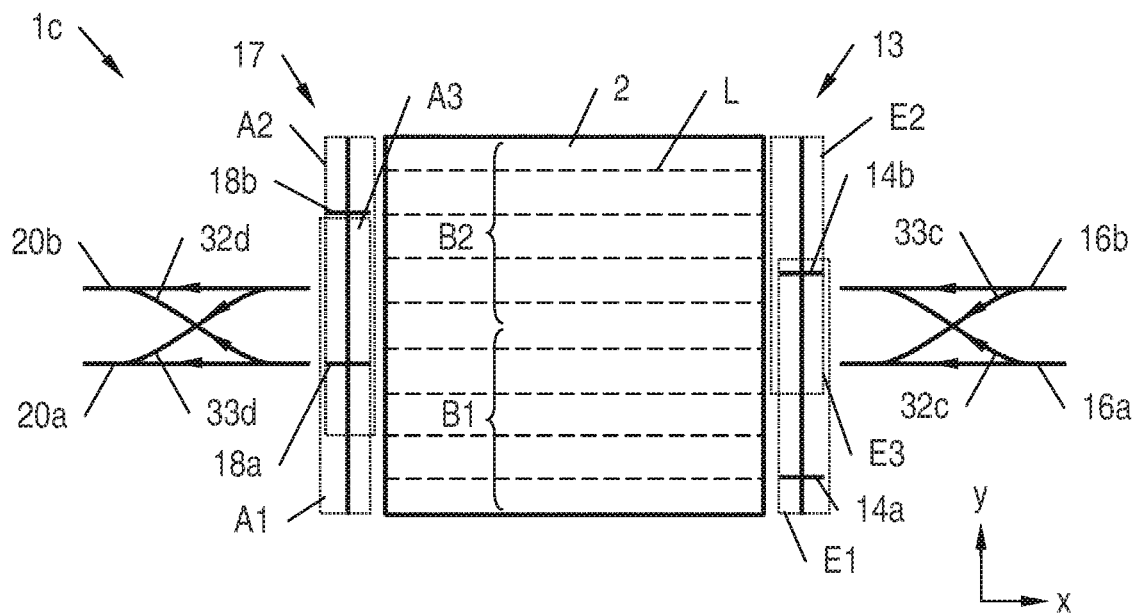
FIG. 6 the storage arrangement from FIG. 4 in a third operating mode with overlapping storage movement areas and overlapping retrieval movement areas, and FIG. 7 the storage arrangement from FIG. 4 in a fourth operating mode with separate storage movement areas and overlapping retrieval movement areas.
Figure 7:
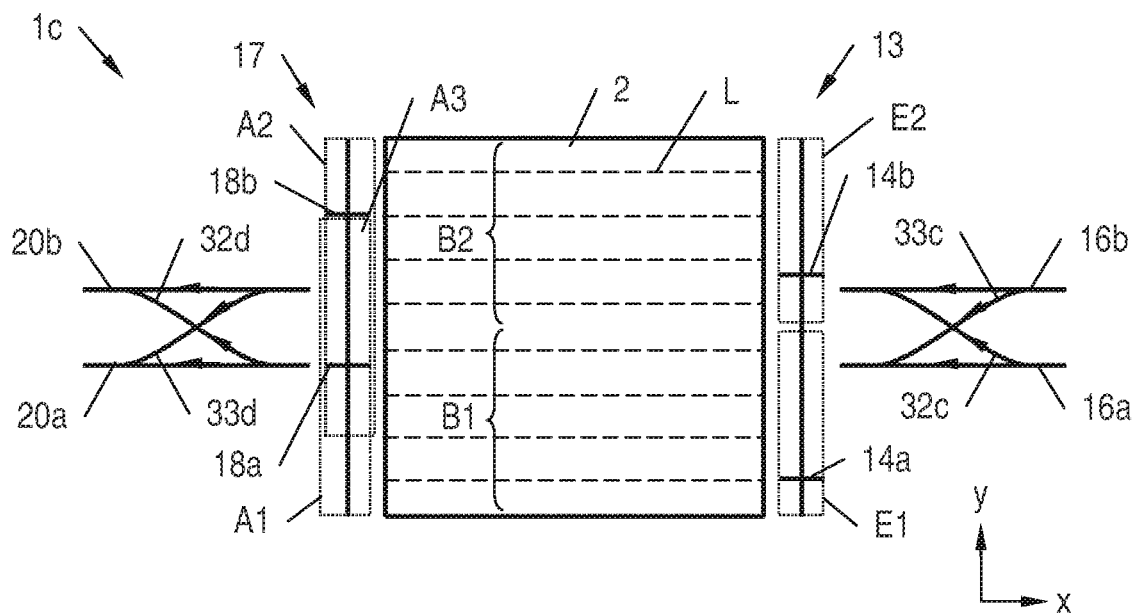

The third operating mode is illustrated in FIG. 6, and the fourth operating mode in FIG. 7.

In this variation of the method presented, in the event of malfunctions, the multiple arrangement of retrieval transport platforms 18a, 18b and/or retrieval conveying devices 20a, 20b is exploited by lifting the strict separation of the movement areas A1, A2 for the retrieval transport platforms 18a, 18b in the event of malfunctions in order to maintain automated warehouse operation even if one of the retrieval transport platforms 18a, 18b and/or one of the retrieval conveying devices 20a, 20b fails. For example, the (lower) first retrieval transport platform 18a may access the (upper) second retrieval conveying device 20b if the (lower) first retrieval conveying device 20a is blocked, and so forth.

Depending on whether the function of the first retrieval transport platform 18a or the second retrieval transport platform 18b is impaired, the first retrieval conveying device 20a may either be associated with the first retrieval transport platform 18a or with the second retrieval transport platform 18b and accessed by the first retrieval transport platform 18a or the second retrieval transport platform 18b for retrieving/transporting away a load 5, or the second retrieval conveying device 20b is either associated with the first retrieval transport platform 18a or with the second retrieval transport platform 18b and accessed by the first retrieval transport platform 18a or the second retrieval transport platform 18b for retrieving/transporting away a load 5.

Depending on whether the function of the first retrieval conveying device 20a or the second retrieval conveying device 20b is impaired, the first retrieval transport platform 18a may either be associated with the first retrieval conveying device 20*a* or with the second retrieval conveying device 20*b* and accessed by the first retrieval transport platform 18*a* for retrieving/transporting away a load 5, or the second retrieval transport platform 18*b* is either associated with the first retrieval conveying device 20*a* or with the second retrieval conveying device 20*b* and accessed by the second retrieval transport platform 18*b* for retrieving/transporting away a load 5.

Switching between the third and the fourth operating modes may again be carried out by the control system 21 based on the storage parameter explained above for the storage zones B1, B2. Specifically, the control system 21 operates the first storage transport platform 14*a* and the second storage transport platform 14*b* in the third operating mode if a difference between the first storage parameter and the second storage parameter lies above a first threshold, and in the fourth operating mode if a difference between the first storage parameter and the second storage parameter lies below the first threshold or below a second threshold, which lies below the first threshold.

Especially in the second and fourth operating modes, it is advantageous if the storage movement area E1 of the first storage transport platform 14*a* is associated with the storage planes L of the first storage zone B1, and the storage movement area E2 of the second storage transport platform 14*b* is associated with the storage planes L of the second storage zone B2. This way, the storage parameters do not only refer to the storage zones B1, B2 but also to the storage movement areas E1, E2 of the storage transport platforms 14*a*, 14*b*.

It is also possible that a storage movement area E1, E2 extends onto the conveyor plane F1, F2 of the respective storage conveying device 16*a*, 16*b*, which is to be accessed by a storage transport platform 14*a*, 14*b*. For example, the first storage movement area E1 may extend to the first storage conveying device 16*a* or beyond it to the second storage conveying device 16*b*. The second storage movement area E2 may extend to the second storage conveying device 16*b* or beyond it to the first storage conveying device 16*a*.

The same applies during retrieval. A retrieval movement area A1, A2 extends onto the conveyor plane F1, F2 of the respective retrieval conveying device 20*a*, 20*b*, which is to be accessed by a retrieval transport platform 18*a*, 18*b*. For example, the first retrieval movement area A1 may extend to the first retrieval conveying device 20*a* or beyond it to the second retrieval conveying device 20*b*. The second retrieval movement area A2 may extend to the second retrieval conveying device 20*b* or beyond it to the first retrieval conveying device 20*a*.

Thus, the operating modes may be summed up as follows with regard to the arrangement of the storage movement areas E1, E2 and the retrieval movement areas A1, A2:

|  | Storage side | Retrieval side |
| --- | --- | --- |
| First operating mode | overlap E1, E2 | no overlap |
| Second operating mode | no overlap | no overlap |
| Third operating mode | overlap E1, E2 | overlap A1, A2 |
| Fourth operating mode | no overlap | overlap A1, A2 |

Furthermore, the operating modes may be summed up as follows with regard to the basis for selecting a particular operating mode:

|  | Storage zones | Retrieval side |
| --- | --- | --- |
| First operating mode | unequal filling degree | flawless functioning |
| Second operating mode | equal filling degree | flawless functioning |
| Third operating mode | unequal filling degree | functional impairment |
| Fourth operating mode | equal filling degree | functional impairment |

It is particularly advantageous if the first storage movement area E1 is maintained when a change from the second operating mode into the first operating mode or from the fourth operating mode into the third operating mode occurs and the second storage movement area E2 is extended to the first storage movement area E1 if the second storage zone B2 is excessively occupied by loads 5 in the second/fourth operating mode compared to the first storage zone B1. The above-mentioned change of state hence concerns a change from an operating mode in which the storage movement areas E1, E2 are separate from one another into an operating mode in which the storage movement areas E1, E2 overlap. In this embodiment, the second storage movement area E2 after said change thus comprises the first storage movement area E1 valid in the second/fourth operating mode and the second storage movement area E2 valid in the second/fourth operating mode, if applicable minus a storage plane L that cannot be reached by the second storage transport platform 14*b* in the first storage movement area E1 for constructional reasons.

It is also particularly advantageous if the second storage movement area E2 is maintained when a change from the second operating mode into the first operating mode or from the fourth operating mode into the third operating mode occurs and the first storage movement area E1 is extended to the second storage movement area E2 if the first storage zone B1 is excessively occupied by loads 5 in the second/fourth operating mode compared to the second storage zone B2. The above-mentioned change of state hence also concerns a change from an operating mode in which the storage movement areas E1, E2 are separate from one another into an operating mode in which the storage movement areas E1, E2 overlap. In this embodiment, the first storage movement area E1 after said change thus comprises the first storage movement area E1 valid in the second/fourth operating mode and the second storage movement area E2 valid in the second/fourth operating mode, if applicable minus a storage plane L that cannot be reached by the first storage transport platform 14*a* in the second storage movement area E2 for constructional reasons.

It is also particularly advantageous if the first storage movement area E1, after a change from the first operating mode into the second operating mode or from the third operating mode into the fourth operating mode, corresponds to the first storage movement area E1 prior to a change from the second operating mode into the first operating mode/from the fourth operating mode into the third operating mode, and the second storage movement area E2, after a change from the first operating mode into the second operating mode or from the third operating mode into the fourth operating mode, corresponds to the second storage movement area E2 prior to a change from the second operating mode into the first operating mode/from the fourth operating mode into the third operating mode. In other words, after a change from the first operating mode into the second operating mode or from the third operating mode into the fourth operating mode, the first storage movement area E1 and the second storage movement area E2 are switched back to their original sizes.

It is advantageous in general if the first storage conveying device 16a and/or the second storage conveying device 16b and/or the first retrieval conveying device 20a and/or the second retrieval conveying device 20b are arranged in the middle third of the vertical extension y of the first or the second storage rack 3a, 3b. This way, loads 5 may be stored and/or retrieved particularly efficiently since the paths to be traveled by the storage transport platforms 14a, 14b and by the retrieval transport platforms 18a, 18b, respectively, are relatively short.

Basically, however, the first storage conveying device 16a and/or the second storage conveying device 16b and/or the first retrieval conveying device 20a and/or the second retrieval conveying device 20b may also be arranged in the lower third or upper third of the vertical extension y of the first or the second storage rack 3a, 3b.

If the storage movement areas E1, E2 overlap, it is additionally advantageous if both storage conveying devices 16a, 16b lie in both storage movement areas E1, E2 or in the storage overlapping area E3. This way, association of the storage transport platforms 14a, 14b with the storage conveying devices 16a, 16b may be particularly flexible.

If the retrieval movement areas A1, A2 overlap, it is additionally advantageous if both retrieval conveying devices 20a, 20b lie in both retrieval movement areas A1, A2 or in the retrieval overlapping area A3. This way, association of the retrieval transport platforms 18a, 18b with the retrieval conveying devices 20a, 20b may also be particularly flexible.

At this point, it should be noted that the mutual connection of the storage conveying devices 16a, 16b by means of the connecting tracks 32c, 33c does not depend on a particular design of the storage movement areas E1, E2 or on a particular operating mode, but that mutual connection of the storage conveying devices 16a, 16b by means of the connecting tracks 32c, 33c may be independent of this.

It should further be noted at this point that the mutual connection of the retrieval conveying devices 20a, 20b by means of the connecting tracks 32c, 33c does not depend on a particular design of the retrieval movement areas A1, A2 or on a particular operating mode, but that mutual connection of the retrieval conveying devices 20a, 20b by means of the connecting tracks 32c, 33c may be independent of this.

It should also be noted at this point that the measures suggested, although they were explained in the scope of box-shaped loading aids in FIG. 1 (containers, cardboard boxes, etc.), may also be used in connection with loading aids of other shapes. In particular, the measures suggested may also be used in connection with overhead pouches and overhead conveying systems.

It should further be noted that although the measures suggested have each been explained in connection with two storage transport platforms 14a, 14b, two storage movement areas E1, E2, two storage conveying devices 16a, 16b, two retrieval transport platforms 18a, 18b, two retrieval movement areas A1, A2, two retrieval conveying devices 20a, 20b, two storage zones B1, B2, and two conveyor planes F1, F2, the principles disclosed may also be applied to more than two storage transport platforms 14a, 14b, more than two storage movement areas E1, E2, more than two storage conveying devices 16a, 16b, more than two retrieval transport platforms 18a, 18b, more than two retrieval movement areas A1, A2, more than two retrieval conveying devices 20a, 20b, more than two storage zones B1, B2, and more than two conveyor planes F1, F2.

In summary, the measures suggested particularly enable decoupling of the storage process from the retrieval process in the rack arrangement 2 and the order-picking system 24a, 24b. In particular, only the storage conveying system 15 is connected to the storage vertical conveying device 13 on the input side, and only the retrieval conveying system 19 is connected to the retrieval vertical conveying device 17 on the output side and/or the storage vertical conveying device 13 is structurally separate from the retrieval vertical conveying device 17. In general, the decoupled operating method is also supported by a fixed association of the storage transport platforms 14a, 14b with the storage conveying devices 16a, 16b and of the retrieval transport platforms 18a, 18b with the retrieval conveying devices 20a, 20b, respectively. On the other hand, a flexible association of the storage transport platforms 14a, 14b with the storage conveying devices 16a, 16b and of the retrieval transport platforms 18a, 18b with the retrieval conveying devices 20a, 20b, respectively, enables operating the rack arrangement 2 and the order-picking system 24a, 24b in a manner which may be well adapted to different circumstances or operating states. This is particularly true if the storage conveying devices 16a, 16b and/or the retrieval conveying devices 20a, 20b are mutually connected. Providing different operating modes also supports adapting the operating method of the rack arrangement 2 and the order-picking system 24a, 24b to different circumstances. In addition, the different operating methods of the storage vertical conveying device 13, 13a ... 13c and the retrieval vertical conveying device 17, 17a ... 17e make use of the phenomenon that during storage of a load 5, the storage place 4 may usually be freely chosen, whereas this is usually not the case during retrieval. This is accounted for by the measures suggested, and a particularly efficient operating method of a rack arrangement 2 and an order-picking system 24a, 24b is achieved.

A particular preferred embodiment of a storage vertical conveying device 13, 13a ... 13c and/or of a retrieval vertical conveying device 17, 17a ... 17e is described in Austrian Patent application A 51090/2018 (AT 521359 B1) and made the subject of this disclosure.

Finally, it should be noted that the scope of protection is determined by the claims. However, the description and the drawings are to be used for construing the claims. The individual features or feature combinations of the different embodiments shown and described may constitute independent inventive solutions. The object underlying the independent inventive solutions may be gathered from the description.

In particular, it should also be noted that in reality, the devices illustrated may also comprise more or fewer components than those illustrated. Some of the devices illustrated or their components may also be represented unscaled and/or enlarged and/or in reduced size.

LIST OF REFERENCE NUMBERS 1, 1a ... 1c Storage arrangement
2 Rack arrangement
3a, 3b Storage rack
4 Storage place
5 Load
6, 6a ... 6e Rack aisle
7 Storage buffer device
8 Storage provisioning device
9 Retrieval buffer device
10 Retrieval provisioning device
11 Storage and retrieval device (shuttle)
12 Storage and retrieval device lifter
13, 13a ... 13c Storage vertical conveying device 14a, 14b Storage transport platform
15 Storage conveying system
16a, 16b Storage conveying device
17, 17a . . . 17e Retrieval vertical conveying device
18a, 18b Retrieval transport platform
19 Retrieval conveying system
20a, 20b Retrieval conveying device
21 Control system
22 Storage vertical mast
23 Retrieval vertical mast
24a, 24b Order-picking system
25a . . . 25f Order-picking station
26 First feeding track
27a, 27b Storage and retrieval distribution track/circular conveying track (loop)
28 Return conveying track
29a, 29b Storage track
30 Second feeding track
31a, 31b Retrieval track
32a . . . 32d First connecting track
33a . . . 33d Second connecting track
34a . . . 34d Goods-in station
35a, 35b Storage distribution track/circular conveying track (loop)
36a, 36b Retrieval distribution track/circular conveying track (loop)
A1, A2 Retrieval movement area
A3 Retrieval overlapping area
B1, B2 Storage zone
E1, E2 Storage movement area
E3 Storage overlapping area
F1, F2 Conveyor plane
L Storage plane
x Longitudinal direction/longitudinal extension (of the rack aisle)
y Vertical direction/vertical extension (of the storage rack)

The invention claimed is:

1. A storage arrangement, comprising
a rack arrangement having a first storage rack and a second storage rack, each having storage places for loads, wherein the storage places are arranged in storage planes located one above the other, and having a rack aisle between the first storage rack and the second storage rack,
a storage buffer device having storage provisioning devices arranged in provisioning planes located one above the other and each configured for interim buffering of a load or multiple loads,
a retrieval buffer device having retrieval provisioning devices arranged in provisioning planes located one above the other and each configured for interim buffering of a load or multiple loads,
storage and retrieval devices, which are each movable on a horizontal travel plane in the rack aisle in front of the storage places, in front of the storage provisioning devices and in front of the retrieval provisioning devices, and each have a load receiving device and are configured for transporting the loads from the storage provisioning devices to the storage places and for transporting the loads from the storage places to the retrieval provisioning devices,
a storage vertical conveying device associated with the rack aisle, the storage vertical conveying device having one single storage vertical mast and multiple storage transport platforms movably arranged on the one single storage vertical mast, the multiple storage transport platforms being controllable independently of one another and each being movable in a storage movement area relative to the provisioning planes, a storage conveying system associated with the rack aisle and connected in terms of conveyance to the storage vertical conveying device, the storage conveyance system being configured for transporting loads to the storage vertical conveying device, wherein the storage transport platforms are configured for transporting the loads from the storage conveying system to the storage provisioning devices,
a retrieval vertical conveying device associated with the rack aisle, the retrieval vertical conveying device having one single retrieval vertical mast and multiple retrieval transport platforms movably arranged on the one single retrieval vertical mast, the multiple retrieval transport platforms being controllable independently of one another and each being movable in a retrieval movement area relative to the provisioning planes, a retrieval conveying system associated with the rack aisle and connected in terms of conveyance to the retrieval vertical conveying device, the retrieval vertical conveying device being configured for transporting loads away from the retrieval vertical conveying device, wherein the retrieval transport platforms are configured for transporting the loads from the retrieval provisioning devices to the retrieval conveying system, and
a control system configured for controlling the storage transport platforms and the retrieval transport platforms independently of one another.

2. The storage arrangement according to claim 1, wherein only the storage conveying system is connected to the storage vertical conveying device on the input side, and only the retrieval conveying system is connected to the retrieval vertical conveying device on the output side.

3. The storage arrangement according to claim 1, wherein the storage vertical conveying device is structurally separate from the retrieval vertical conveying device.

4. The storage arrangement according to claim 1, wherein the retrieval conveying system comprises a first retrieval conveying device, which is associated with a first retrieval transport platform of the retrieval transport platforms and with a second retrieval transport platform of the retrieval transport platforms and accessible by the first retrieval transport platform and by the second retrieval transport platform for retrieving a load.

5. The storage arrangement according to claim 1, wherein the retrieval conveying system comprises a first retrieval conveying device and a second retrieval conveying device, which are arranged in conveyor planes located one above the other, and
wherein the first retrieval conveying device is associated with a first retrieval transport platform of the retrieval transport platforms and accessible by the first retrieval transport platform for retrieving a load, and
wherein the second retrieval conveying device is associated with a second retrieval transport platform of the retrieval transport platforms and accessible by the second retrieval transport platform for retrieving a load.

6. The storage arrangement according to claim 5, wherein the first retrieval conveying device and the second retrieval conveying device are connected in terms of conveyance to each other.

7. The storage arrangement according to claim 6, wherein the connection in terms of conveyance between the first retrieval conveying device and the second retrieval conveying device comprises a joining of the first retrieval conveying device and the second retrieval conveying device.

8. The storage arrangement according to claim 6, wherein the connection in terms of conveyance mutually connects the first retrieval conveying device and the second retrieval conveying device.

9. An order-picking system comprising with a storage arrangement according to claim 6, a first order-picking station and a second order-picking station,
wherein the first order-picking station and the second order-picking station are each connected in terms of conveyance both to the first retrieval conveying device and to the second retrieval conveying device via the connection in terms of conveyance between the first retrieval conveying device and the second retrieval conveying device.

10. The storage arrangement according to claim 1, wherein the retrieval conveying system comprises a first retrieval conveying device and a second retrieval conveying device, which are arranged in conveyor planes located one above the other, and
wherein the first retrieval conveying device may either be associated with a first retrieval transport platform of the retrieval transport platforms or with a second retrieval transport platform of the retrieval transport platforms and is accessible by the first or the second retrieval transport platform for retrieving a load, and
wherein the second retrieval conveying device may either be associated with the first retrieval transport platform of the retrieval transport platforms or with the second retrieval transport platform of the retrieval transport platforms and is accessible by the first or the second retrieval transport platform for retrieving a load.

11. The storage arrangement according to claim 10,
wherein the first retrieval conveying device and the second retrieval conveying device are connected in terms of conveyance to each other.

12. An order-picking system comprising
a storage arrangement according to claim 11,
a first order-picking station and
a second order-picking station,
wherein the first order-picking station and the second order-picking station are each connected in terms of conveyance both to the first retrieval conveying device and to the second retrieval conveying device via the connection in terms of conveyance between the first retrieval conveying device and the second retrieval conveying device.

13. The storage arrangement according to claim 1, wherein the storage conveying system comprises a first storage conveying device, which is associated with a first storage transport platform of the storage transport platforms and with a second storage transport platform of the storage transport platforms and accessible by the first storage transport platform and by the second storage transport platform for storing a load.

14. The storage arrangement according to claim 13, wherein the first storage conveying device and/or the second storage conveying device and/or the first retrieval conveying device and/or the second retrieval conveying device are arranged in the middle third of the vertical extension of the first or the second storage rack.

15. The storage arrangement according to claim 1, wherein the storage conveying system comprises a first storage conveying device and a second storage conveying device, which are arranged in conveyor planes located one above the other, and
wherein the first storage conveying device is associated with a first storage transport platform of the storage transport platforms and accessible by the first storage transport platform for storing a load, and
wherein the second storage conveying device is associated with a second storage transport platform of the storage transport platforms and accessible by the second storage transport platform for storing a load.

16. The storage arrangement according to claim 1, wherein the storage conveying system comprises a first storage conveying device and a second storage conveying device, which are arranged in conveyor planes located one above the other, and
wherein the first storage conveying device may either be associated with a first storage transport platform of the storage transport platforms or with a second storage transport platform of the storage transport platforms and is accessible by the first or the second storage transport platform for storing a load, and
wherein the second storage conveying device may either be associated with the first storage transport platform of the storage transport platforms or with the second storage transport platform of the storage transport platforms and is accessible by the first or the second storage transport platform for storing a load.

17. The storage arrangement according to claim 13, wherein the control system,
for controlling the first storage transport platform and the second storage transport platform in a first operating mode, is configured such that the storage movement areas of the first storage transport platform and the second storage transport platform vertically overlap during storage of loads, and
for controlling the first retrieval transport platform and the second retrieval transport platform in the first operating mode, is configured such that the retrieval movement areas of the first retrieval transport platform and the second retrieval transport platform are always vertically separate from one another during retrieval of loads.

18. A method for operating a storage arrangement comprising
a rack arrangement having a first storage rack and a second storage rack, each having storage places for loads, wherein the storage places are arranged in storage planes located one above the other, and having a rack aisle between the first storage rack and the second storage rack,
a storage buffer device having storage provisioning devices arranged in provisioning planes located one above the other and each configured for interim buffering of a load or multiple loads,
a storage vertical conveying device, the storage vertical conveying device having one single storage vertical mast and multiple storage transport platforms movably arranged on the one single storage vertical mast, the multiple storage transport platforms being controllable independently of one another and each being movable in a storage movement area relative to the provisioning planes,
a storage conveying system connected in terms of conveyance to the storage vertical conveying device,
wherein the storage conveying system is configured for transporting loads to the storage vertical conveying device, and wherein the multiple transport platforms are configured for transporting loads are transported from the storage conveying system to the storage provisioning devices, a retrieval buffer device having retrieval provisioning devices arranged in provisioning planes located one above the other and each configured for interim buffering of a load or multiple loads, a retrieval vertical conveying device, the retrieval vertical conveying device having one single retrieval vertical mast and multiple retrieval transport platforms movably arranged on the one single retrieval vertical mast, the multiple retrieval transport platforms being controllable independently of one another and each being movable in a retrieval movement area relative to the provisioning planes, a retrieval conveying system connected in terms of conveyance to the retrieval vertical conveying device, wherein the retrieval conveying system is configured for transporting loads away from the retrieval vertical conveying device, and wherein the multiple retrieval transport platforms are configured for transporting loads from the retrieval provisioning devices to a retrieval conveying system, storage and retrieval devices, which are each movable on a horizontal travel plane in the rack aisle in front of the storage places, in front of the storage provisioning devices and in front of the retrieval provisioning devices and which each have a load receiving device for transporting the loads between a storage place, a storage provisioning device and a retrieval provisioning device, and a control system, the control system being configured for controlling the storage transport platforms, such that loads to be stored are taken over from the storage conveying system and released onto the storage buffer device, and for controlling the retrieval transport platforms, such that loads to be retrieved are taken over from the retrieval buffer device and released onto the retrieval conveying system.

19. The method according to claim 18, wherein the storage conveying system comprises a first storage conveying device and a second storage conveying device, which are arranged in conveyor planes located one above the other, and wherein the loads are transported via a first storage transport platform of the storage transport platforms or a second storage transport platform of the storage transport platforms from the first storage conveying device to the storage provisioning devices or from the second storage conveying device to the storage provisioning devices.

20. The method according to claim 19,
wherein the first storage conveying device may either be associated with the first storage transport platform of the storage transport platforms or with the second storage transport platform of the storage transport platforms and is accessible by the first storage transport platform or by the second storage transport platform for storing a load, and
wherein the second storage conveying device may either be associated with the first storage transport platform of the storage transport platforms or with the second storage transport platform of the storage transport platforms and is accessible by the first storage transport platform or by the second storage transport platform for storing a load.

21. The method according to claim 18, wherein the retrieval conveying system comprises a first retrieval conveying device and a second retrieval conveying device, which are arranged in conveyor planes located one above the other, and wherein the loads are transported via a first retrieval transport platform of the retrieval transport platforms or a second retrieval transport platform of the retrieval transport platforms from the retrieval provisioning devices to the first retrieval conveying device or from the retrieval provisioning devices to the second retrieval conveying device.

22. The method according to claim 21,
wherein the first retrieval conveying device is associated with a first retrieval transport platform of the retrieval transport platforms and accessible by the first retrieval transport platform for transporting away a load, and
wherein the second retrieval conveying device is associated with a second retrieval transport platform of the retrieval transport platforms and accessible by the second retrieval transport platform for transporting away a load.

23. The method according to claim 18, wherein loads to be stored are delivered by the storage conveying system and released by the storage conveying system to the storage vertical conveying device only, and
wherein loads to be retrieved are released onto the retrieval conveying system by the retrieval vertical conveying device only and transported away by the retrieval conveying system.

24. The method according to claim 18, wherein
the control system is configured for controlling a first storage transport platform and a second storage transport platform of the storage transport platforms in a first operating mode such that the storage movement areas of the first storage transport platform and the second storage transport platform vertically overlap during storage of loads, and
the control system is configured for controlling a first retrieval transport platform and a second retrieval transport platform of the retrieval transport platforms in the first operating mode such that the retrieval movement areas of the first retrieval transport platform and the second retrieval transport platform are always vertically separate from one another during retrieval of loads.

25. The method according to claim 24,
wherein an evaluation unit determines and compares a first storage parameter for a first storage zone of the rack arrangement and a second storage parameter for a second storage zone of the rack arrangement, wherein the first storage parameter is defined by the ratio between available storage places and occupied storage places in the first storage zone, and the second storage parameter is defined by the ratio between available storage places and occupied storage places in the second storage zone, and wherein the first storage zone has a different vertical extension than the second storage zone,
wherein the control system is configured for operating the first storage transport platform and the second storage transport platform in the first operating mode if a difference between the first storage parameter and the second storage parameter lies above a first threshold, and
wherein the control system is configured for operating the first storage transport platform and the second storage transport platform in a second operating mode if a difference between the first storage parameter and the second storage parameter lies below the first threshold or below a second threshold, which lies below the first threshold, wherein the storage movement areas of the first storage transport platform and the second storage transport platform are vertically separate from one another in the second operating mode during storage of loads, and wherein the retrieval movement areas of the first retrieval transport platform and the second retrieval transport platform are always vertically separate from one another during retrieval in the second operating mode and irrespectively of a storage parameter.

26. The method according to claim 25, wherein the control system is configured for operating the first retrieval transport platform and the second retrieval transport platform in the first operating mode or in the second operating mode if operating ability of the first retrieval transport platform and the second retrieval transport platform and of the first retrieval conveying device and the second retrieval conveying device is determined by a diagnostic unit.

27. The method according to claim 24, wherein the control system is configured for operating the first retrieval transport platform and the second retrieval transport platform in a third operating mode or in a fourth operating mode if an impairment of the operating ability of the first retrieval transport platform or the second retrieval transport platform or of the first retrieval conveying device or the second retrieval conveying device is determined by a diagnostic unit, and wherein the retrieval movement areas of the first retrieval transport platform and the second retrieval transport platform vertically overlap both in the third operating mode and in the fourth operating mode during retrieval of loads, and wherein the storage movement areas of the first storage transport platform and the second storage transport platform vertically overlap in the third operating mode during storage of loads, and the storage movement areas of the first storage transport platform and the second storage transport platform are vertically separate from one another in the fourth operating mode during storage of loads.

28. The method according to claim 25, wherein an evaluation unit determines and compares a first storage parameter for a first storage zone of the rack arrangement and a second storage parameter for a second storage zone of the rack arrangement, wherein the first storage parameter is defined by the ratio between available storage places and occupied storage places in the first storage zone and the second storage parameter is defined by the ratio between available storage places and occupied storage places in the second storage zone and wherein the first storage zone has a different vertical extension than the second storage zone, and wherein the control system is configured for operating the first storage transport platform and the second storage transport platform in the third operating mode if a difference between the first storage parameter and the second storage parameter lies above a first threshold, and wherein the control system is configured for operating the first storage transport platform and the second storage transport platform in a fourth operating mode if a difference between the first storage parameter and the second storage parameter lies below the first threshold or below a second threshold, which lies below the first threshold.

29. The method according to claim 18, wherein the first storage movement area of the first storage transport platform is associated with the storage planes of the first storage zone, and the second storage movement area of the second storage transport platform is associated with the storage planes of the second storage zone.

30. The method according to claim 18, wherein an evaluation unit determines and compares a first storage parameter for a first storage zone of the rack arrangement and a second storage parameter for a second storage zone of the rack arrangement, wherein the first storage parameter is defined by the ratio between available storage places and occupied storage places in the first storage zone, and the second storage parameter is defined by the ratio between available storage places and occupied storage places in the second storage zone, and wherein the first storage zone has a different vertical extension than the second storage zone, and wherein the loads are stored into the rack arrangement in respect of mutually adapting storage parameters in the first storage zone and in the second storage zone.

31. The method according to claim 18, wherein the loads are randomly stored into the rack arrangement within the first storage zone and/or within the second storage zone.

32. The method according to claim 20, wherein the loads to be stored into the rack arrangement are randomly and/or evenly distributed to a first storage conveying device and a second storage conveying device of the storage conveying system.

33. The method according to claim 18, wherein some of the loads, while they are transported away, are transferred from a first retrieval conveying device of the retrieval conveying system onto a second retrieval conveying device of the retrieval conveying system, and some of the loads, while they are transported away, are transferred from the second retrieval conveying device onto the first retrieval conveying device.

* * * * *

UNITED STATES PATENT AND TRADEMARK OFFICE
CERTIFICATE OF CORRECTION

| | | |
|---|---|---|
| PATENT NO. | : 12,077,386 B2 | Page 1 of 1 |
| APPLICATION NO. | : 17/292751 | |
| DATED | : September 3, 2024 | |
| INVENTOR(S) | : Christian Ahammer et al. | |

It is certified that error appears in the above-identified patent and that said Letters Patent is hereby corrected as shown below:

In the Claims

In Column 45, Line 7 (Line 1 of Claim 9) delete "with"

In Column 46, Line 26 (Line 1 of Claim 17) change "claim 13" to --claim 16--

In Column 47, Line 2 (Line 27 of Claim 18) delete "are transported"

In Column 49, Line 42 (Line 1 of Claim 28) change "claim 25" to --claim 27--

In Column 50, Line 39 (Line 1 of Claim 32) change "claim 20" to --claim 18--

Signed and Sealed this
Tenth Day of December, 2024

Katherine Kelly Vidal
*Director of the United States Patent and Trademark Office*